US012327520B2

(12) United States Patent
Lee et al.

(10) Patent No.: US 12,327,520 B2
(45) Date of Patent: Jun. 10, 2025

(54) DISPLAY PANEL AND DISPLAY DEVICE USING THE SAME

(71) Applicant: LG Display Co., Ltd., Seoul (KR)

(72) Inventors: Dong Gun Lee, Paju-si (KR); Bo Yun Jung, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 29 days.

(21) Appl. No.: 17/989,300

(22) Filed: Nov. 17, 2022

(65) Prior Publication Data

US 2023/0081008 A1 Mar. 16, 2023

Related U.S. Application Data

(63) Continuation of application No. 17/395,337, filed on Aug. 5, 2021, now Pat. No. 11,538,409.

(30) Foreign Application Priority Data

Oct. 30, 2020 (KR) ........................ 10-2020-0143009

(51) Int. Cl.
*G09G 3/3233* (2016.01)

(52) U.S. Cl.
CPC ..... *G09G 3/3233* (2013.01); *G09G 2300/043* (2013.01); *G09G 2320/0233* (2013.01)

(58) Field of Classification Search
CPC ........... G09G 3/3233; G09G 2300/043; G09G 2320/0233
See application file for complete search history.

(56) References Cited

U.S. PATENT DOCUMENTS

| | | | | |
|---|---|---|---|---|
| 11,217,639 | B2 | 1/2022 | Baek et al. | |
| 2007/0018917 | A1 | 1/2007 | Miyazawa | |
| 2018/0075804 | A1 | 3/2018 | Kim et al. | |
| 2020/0105843 | A1 | 4/2020 | Baek et al. | |
| 2021/0241671 | A1 * | 8/2021 | Lee | G09G 3/2003 |
| 2021/0320164 | A1 | 10/2021 | Lee et al. | |
| 2021/0335280 | A1 | 10/2021 | Liu | |
| 2022/0005876 | A1 | 1/2022 | Xie | |
| 2022/0102446 | A1 | 3/2022 | Baek et al. | |

FOREIGN PATENT DOCUMENTS

| | | | | |
|---|---|---|---|---|
| KR | 10-2017-0077921 A | 7/2017 | | |
| KR | 10-2020-0034946 A | 4/2020 | | |
| KR | 10-2020-0036137 A | 4/2020 | | |
| KR | 10-2020-0036781 A | 4/2020 | | |
| WO | WO-2022082430 A1 * | 4/2022 | | G09G 3/3233 |

OTHER PUBLICATIONS

United States Office Action, U.S. Appl. No. 17/395,337, filed Apr. 6, 2022, 18 pages.
Korean Intellectual Property Office, Office Action, Korean Patent Application No. 10-2020-0143009, Mar. 31, 2024, 13 pages.

* cited by examiner

*Primary Examiner* — Stacy Khoo
(74) *Attorney, Agent, or Firm* — Fenwick & West LLP

(57) ABSTRACT

The present disclosure relates to a display panel and a display device using the same, and includes a first pixel area in which pixels connected to a first cathode electrode are disposed, and a second pixel area in which pixels connected to a second cathode electrode are disposed. A data voltage of pixel data to be written to a pixel in the second pixel area is applied to a first gate electrode of a driving element disposed in the second pixel area. A compensation voltage for increasing the luminance of the second pixel area is applied to the gate electrode of the driving element.

17 Claims, 20 Drawing Sheets

DISPLAY PANEL AND DISPLAY DEVICE USING THE SAME

CROSS-REFERENCE TO RELATED APPLICATION

This application is a continuation of U.S. patent application Ser. No. 17/395,337 filed on Aug. 5, 2021, which claims priority to and the benefit of Republic of Korea Patent Application No. 10-2020-0143009, filed Oct. 30, 2020, each of which is hereby incorporated by reference in its entirety.

BACKGROUND

1. Field

The present disclosure relates to a display panel and a display device using the same.

2. Discussion of Related Art

Electroluminescent display devices are roughly classified into inorganic light emitting display devices and organic light emitting display devices depending on the material of an emission layer. The organic light emitting display device of an active matrix type includes an organic light emitting diode (hereinafter, referred to as "OLED") that emits light by itself, and has an advantage in that the response speed is fast and the luminous efficiency, luminance, and viewing angle are large. In the organic light emitting display device, the OLED is formed in each pixel. The organic light emitting display device has a fast response speed, excellent luminous efficiency, luminance, and viewing angle, and has excellent contrast ratio and color reproducibility since it can express black grayscales in complete black.

Multi-media functions of mobile terminals have been improved. For example, a camera is built into a smartphone by default, and the resolution of the camera is increasing to the level of a conventional digital camera. A front camera of the smartphone restricts a screen design, making it difficult to design the screen. In order to reduce a space occupied by the camera, a screen design including a notch or punch hole has been adopted in the smartphone, but the screen size is still limited due to the camera, making it impossible to implement a full-screen display.

SUMMARY

A local area with low pixels per inch (PPI) may be provided within a screen on a display panel, and images may be captured by cameras through the area. A pixel area of a low PPI may have a lower luminance compared to a pixel region of a high PPI, which may cause an increase of the amount of current necessary to drive light emitting elements in pixels with the low PPI. In this case, a transistor to drive a light emitting element operates in a linear area, resulting in uneven luminance in the low PPI area, even with small variations in source-drain voltage of the transistor, and thus image quality may deteriorate.

An object of the present disclosure is to solve the above-mentioned needs and/or problems.

The present disclosure provides a display panel capable of implementing a full-screen display and achieving uniform luminance on the entire screen, and a display device using the same.

A display panel according to an embodiment of the present disclosure includes a first pixel area in which pixels connected to a first cathode electrode are disposed; and a second pixel area in which pixels connected to a second cathode electrode are disposed. A voltage applied to the second cathode electrode is lower than a voltage applied to the first cathode electrode.

A display panel according to an embodiment of the present disclosure includes a sensor module disposed under the rear surface of the display panel to convert light incident through the second pixel area into an electrical signal.

In the present disclosure, since a sensor is disposed on a screen on which an image is displayed, a full-screen display can be implemented.

The present disclosure separates the cathode electrode of the low PPI area from the cathode electrode of the high PPI area and sets the voltage applied to the cathode electrode of the low PPI area to be different from the voltage applied to the cathode electrode of the high PPI region, whereby a voltage margin between a pixel driving voltage ELVDD and a low-potential power voltage ELVSS may be sufficiently secured in each of the low PPI area and the high PPI area. As a result, according to the present disclosure, since the driving elements disposed in each of the high PPI area and the low PPI area can be operated in their saturation regions, the luminance may be uniform throughout the entire pixel array, thereby improving image quality.

Furthermore, the present disclosure may improve the picture quality of the pixel array and reduce consumption power by setting a large voltage margin between the pixel driving voltage ELVDD and the low-potential power voltage ELVSS in the low PPI area, and setting a relatively small voltage margin between the pixel driving voltage ELVDD and the low-potential power voltage ELVSS in the high PPI area.

The effects of the present disclosure are not limited to those mentioned above, and other effects that are not mentioned will be clearly understood by those skilled in the art from the description of the claims.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1:
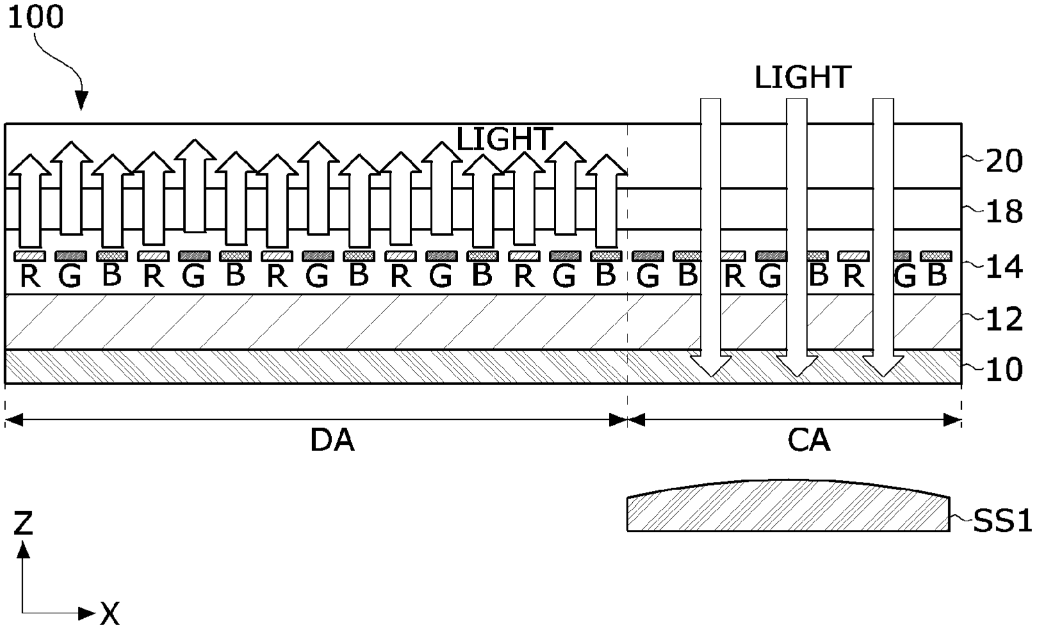
FIG. 1 is a cross-sectional view schematically showing a display panel according to an embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as “comprising,” “including,” “having,” and “comprising” used herein are generally intended to allow other components to be added unless the terms are used with the term “only.” Any references to singular may include plural unless expressly stated otherwise.

Components are interpreted to include an ordinary error range even if not expressly stated.

When the position relation between two components is described using the terms such as “on,” “above,” “below,” and “next,” one or more components may be positioned between the two components unless the terms are used with the term “immediately” or “directly.”

The terms “first,” “second,” and the like may be used to distinguish components from each other, but the functions or structures of the components are not limited by ordinal numbers or component names in front of the components.

The same reference numerals may refer to substantially the same elements throughout the present disclosure.

The following embodiments can be partially or entirely bonded to or combined with each other and can be linked and operated in technically various ways. The embodiments can be carried out independently of or in association with each other.

In a display device of the present disclosure, a pixel circuit may include at least one of an n-channel transistor and a p-channel transistor. Transistors may be implemented as oxide thin film transistors (oxide TFTs) including an oxide semiconductor, low temperature polysilicon (LTPS) TFTs including low temperature polysilicon, or the like. Further, each of the transistors may be implemented as a p-channel TFT or an n-channel TFT. In embodiments, descriptions will be given based on an example in which the transistors of the pixel circuit are implemented as the p-channel TFTs, but the present disclosure is not limited thereto.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. The gate-on voltage is set to a voltage higher than a threshold voltage of a transistor, and the gate-off voltage is set to a voltage lower than the threshold voltage of the transistor. A transistor is turned on in response to a gate-on voltage and is turned off in response to a gate-off voltage. In the case of an n-channel transistor, a gate-on voltage may be a gate high voltage VGH and VEH, and a gate-off voltage may be a gate low voltage VGL and VEL. In the case of a p-channel transistor, a gate-on voltage may be the gate low voltage VGL and VEL, and a gate-off voltage may be the gate high voltage VGH and VEH.

Hereinafter, various embodiments of the present disclosure will be described in detail with reference to the accompanying drawings.

Figure 2:
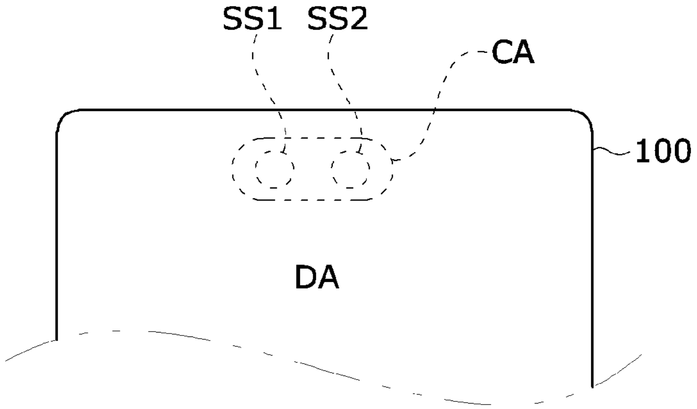
FIG. 2 is a plan view showing an area in which a sensor module is disposed in a screen of a display panel according to an embodiment of the present disclosure.

Referring to FIGS. 1 and 2, a screen on a display panel 100 according to an embodiment of the present disclosure includes a pixel array that reproduces an input image. The pixel array includes a first pixel area DA and a second pixel area CA having different resolutions or pixels per inch (PPI).

The first pixel area DA is a main display area that occupies most of the screen. In the second pixel area CA, pixels that are arranged at a lower PPI than the first pixel area DA display pixel data.

One or more sensor modules SS1 and SS2 may be disposed under the rear surface of the display panel 100. The sensor modules SS1 and SS2 face the second pixel area CA. The sensor modules SS1 and SS2 may include, for example, various sensors such as an imaging module (or camera module) including image sensors, an infrared sensor module, and an illuminance sensor module. The sensor modules SS1 and SS2 photoelectrically convert light received through the second pixel area CA to output an electrical signal. Images may be obtained from the output signals of the sensor modules SS1 and SS2. The second pixel area CA may include a light transmitting portion disposed in a portion secured by lowering the PPI in order to increase the transmittance of light directed to the sensor modules SS1 and SS2.

Since the first pixel area DA and the second pixel area CA include pixels, the input image may be displayed in the first pixel area DA and the second pixel area CA.

Each of the pixels in the first pixel area DA and the second pixel area CA includes sub-pixels having different colors to reproduce colors in an image. The sub-pixels include a red sub-pixel (hereinafter referred to as "R sub-pixel"), a green sub-pixel (hereinafter referred to as "G sub-pixel"), and a blue sub-pixel (hereinafter referred to as "B sub-pixel"). Although not shown, each of the pixels may further include a white sub-pixel (hereinafter referred to as "W sub-pixel"). Each of the sub-pixels may include a pixel circuit that drives a light emitting element.

An image quality compensation algorithm for compensating the luminance and color coordinates of pixels may be applied to the second pixel area CA having a PPI lower than that of the first pixel area DA.

In the display device of the present disclosure, since pixels are arranged in the second pixel area CA where the sensor is disposed, the display area of the screen is not limited due to an imaging module such as a camera. Accordingly, the display device of the present disclosure may implement a full-screen display.

The display panel 100 has a width in an X-axis direction, a length in a Y-axis direction, and a thickness in a Z-axis direction. The display panel 100 may include a circuit layer 12 disposed on a substrate and a light emitting element layer 14 disposed on the circuit layer 12. A polarizing plate 18 may be disposed on the light emitting element layer 14, and a cover glass 20 may be disposed on the polarizing plate 18.

The circuit layer 12 may include a pixel circuit connected to wires such as data lines, gate lines, and power lines, and a gate driver connected to the gate lines. The circuit layer 12 may include transistors implemented as thin film transistors (TFT) and circuit elements such as capacitors. The wires and circuit elements of the circuit layer 12 may be implemented with a plurality of insulating layers, two or more metal layers separated with an insulating layer therebetween, and an active layer including a semiconductor material.

The light emitting element layer 14 may include a light emitting element driven by the pixel circuit. The light emitting element may be implemented with an OLED. The OLED includes an organic compound layer formed between an anode and a cathode. The organic compound layer may include a hole injection layer HIL, a hole transport layer HTL, an emission layer EML, an electron transport layer ETL, and an electron injection layer EIL, but is not limited thereto. When a voltage is applied to the anode and cathode of the OLED, holes that have passed through the hole transport layer HTL and electrons that have passed through the electron transport layer ETL move to the emission layer EML to form excitons, and as a result, visible light is emitted from the emission layer EML. The light emitting element layer 14 may be disposed on pixels that selectively transmit red, green, and blue wavelengths and may further include a color filter array.

The light emitting element layer 14 may be covered with a passivation layer, and the passivation layer may be covered with an encapsulation layer. The passivation layer and the encapsulation layer may have a structure in which an organic film and an inorganic film are alternately stacked. The inorganic film blocks or at least reduces the penetration of moisture or oxygen. The organic film flattens the surface of the inorganic film. When the organic film and the inorganic film are stacked in multiple layers, the movement path of moisture or oxygen becomes longer than that in a single layer, so that the penetration of moisture/oxygen affecting the light emitting element layer 14 may be effectively blocked or at least reduced.

The polarizing plate 18 may be adhered to the encapsulation layer. The polarizing plate 18 improves outdoor visibility of the display device. The polarizing plate 18 reduces light reflected from the surface of the display panel 100 and blocks light reflected from the metal of the circuit layer 12 to improve brightness of the pixels. The polarizing plate 18 may be implemented as a polarizing plate in which a linear polarizing plate and a phase delay film are bonded, or a circular polarizing plate.

Figure 3:
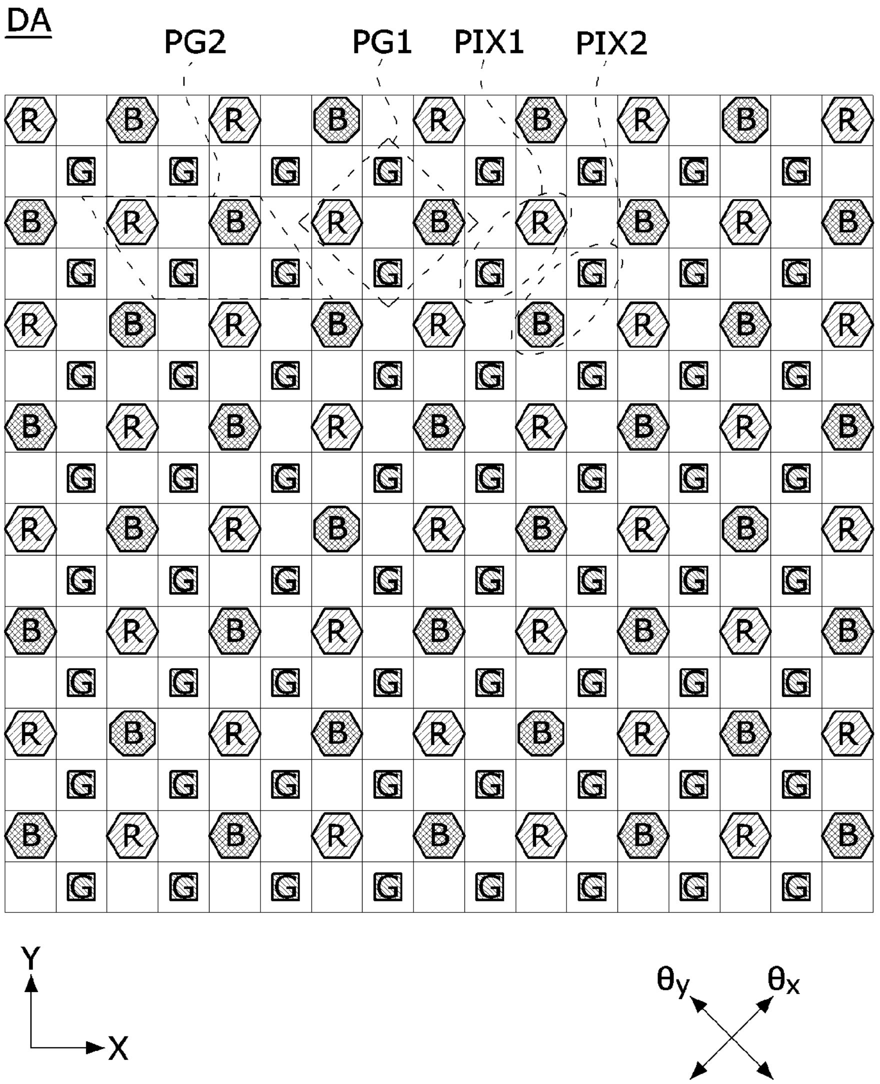
FIG. 3 is a diagram showing an arrangement of pixels in a high PPI area according to an embodiment of the present disclosure.
Figure 4:
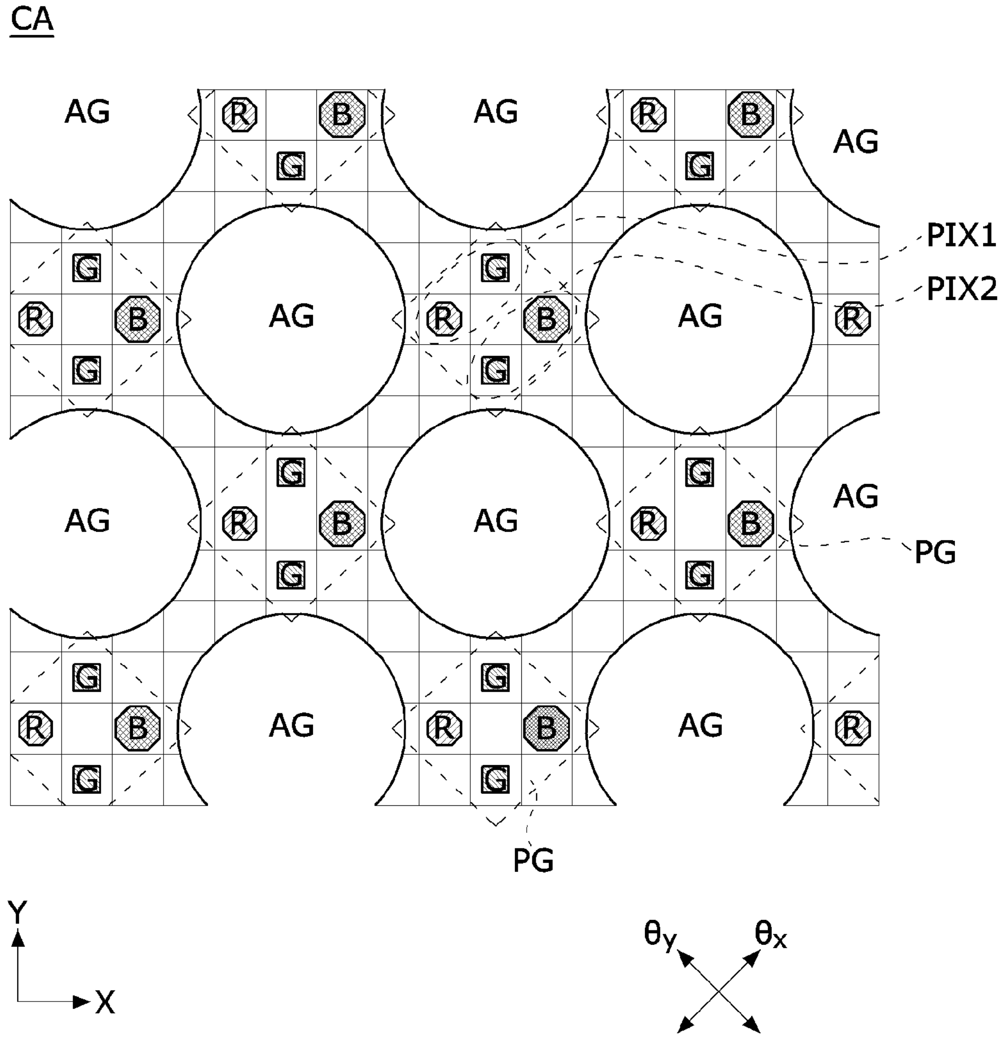
FIG. 4 is a diagram showing an arrangement of pixels in a low PPI area according to an embodiment of the present disclosure.

FIG. 3 is a diagram showing an arrangement of pixels in a high PPI area according to one embodiment. FIG. 4 is a diagram showing an example for pixels and light transmitting portions in a low PPI area according to one embodiment. In FIGS. 3 and 4, wires connected to the pixels are omitted.

Referring to FIG. 3, the first pixel area DA includes pixels PIX1 and PIX2 arranged with high PPI. Each of the pixels PIX1 and PIX2 may be implemented as a real type pixel in which R, G, and B sub-pixels of three primary colors constitute one pixel. Each of the pixels PIX1 and PIX2 may further include a W sub-pixel omitted from the drawing.

Each of the pixels may be composed of two sub-pixels using a sub-pixel rendering algorithm. For example, a first pixel PIX1 may be composed of a R sub-pixel and a first G sub-pixel, and a second pixel PIX2 may be composed of a B sub-pixel and a second G sub-pixel. Insufficient color representation in each of the first and second pixels PIX1 and PIX2 may be compensated by an average value of corresponding color data between neighboring pixels. White may be expressed by combining the R, G, and B subpixels of the first and second pixels PIX1 and PIX2.

The pixels in the first pixel area DA may be defined as unit pixel groups PG1 and PG2 having a predetermined size. The unit pixel groups PG1 and PG2 are pixel areas of the predetermined size including four sub-pixels. The unit pixel groups PG1 and PG2 are repeatedly arranged in a first direction (X-axis), in a second direction (Y-axis) perpendicular to the first direction, and in an inclined direction (θx and θy axes) between the first and second directions. θx and θy denote the directions of the inclined axes formed by rotating the X-axis and Y-axis by 45°, respectively.

The unit pixel groups PG1 and PG2 may be a parallelogram-shaped pixel area PG1 or a rhombus-shaped pixel area PG2. The unit pixel groups PG1 and PG2 should be interpreted as including a rectangular shape, a square shape, and the like.

The sub-pixels of the unit pixel groups PG1 and PG2 include a sub-pixel of a first color, a sub-pixel of a second color, and a sub-pixel of a third color, in which two sub-pixels of any one of the first to third color sub-pixels are included. For example, the unit pixel groups PG1 and PG2 may include one R sub-pixel, two G sub-pixels, and one B sub-pixel. In the sub-pixels in the unit pixel groups PG1 and PG2, the luminous efficiency of the light emitting element may be different for each color. In consideration of this, the size of the sub-pixels may vary for each color. For example, among the R, G, and B sub-pixels, the B sub-pixel may be the largest and the G sub-pixel may be the smallest.

Referring to FIG. 4, the second pixel area CA includes pixel groups PG spaced apart by a predetermined distance and light transmitting portions AG disposed between the neighboring pixel groups PG. External light is received by the lens of the sensor module through the light transmitting portions AG. The light transmitting portions AG may include transparent media having high transmittance without metal so that light may be incident with minimal light loss. In other words, the light transmitting portions AG may be formed of transparent insulating materials without including metal wires or pixels. The PPI of the second pixel area CA is lower than that of the first pixel area DA due to the light transmitting portions AG.

The pixel group PG of the second pixel area CA may include one or two pixels. Each pixel of the pixel group may include two to four sub-pixels. For example, one pixel in the pixel group may include R, G, and B sub-pixels or may include two sub-pixels, and further a W sub-pixel. In the example of FIG. 4, a first pixel PIX1 is composed of R and G sub-pixels, and a second pixel PIX2 is composed of B and G sub-pixels, but the present disclosure is not limited thereto.

The first and second pixels PIX1 and PIX2 may be disposed in the pixel group PG disposed in the second pixel area. The first pixel PIX1 may be comprised of R and first G sub-pixels, and the second pixel PIX2 may be comprised of B and second G sub-pixels. Insufficient color representation in each of the first and second pixels PIX1 and PIX2 may be compensated by an average value of corresponding color data between neighboring pixels. White may be expressed by combining the R, G, and B sub-pixels of the first and second pixels PIX1 and PIX2.

The shape of the light transmitting portions AG is illustrated to be circular in FIG. 4, but is not limited thereto. For example, the light transmitting portions AG may be designed in various shapes such as a circle, an ellipse, and a polygon.

Due to process deviation and element properties deviation caused in the manufacturing process of the display panel, there may be a difference in the electrical properties of a driving element between pixels, and this difference may be increased as the driving time of the pixels elapses. In order to compensate for deviation in the electrical properties of the driving element between pixels, an internal compensation technique or an external compensation technique may be applied to an organic light emitting display device. The internal compensation technique samples a threshold voltage of the driving element for each sub-pixel by using an internal compensation circuit implemented in each pixel circuit, and compensates a gate-source voltage Vgs of the driving element by the threshold voltage. The external compensation technique senses in real time a current or voltage of the driving element that varies depending on the electrical properties of the driving elements, by using an external compensation circuit. The external compensation technique modulates pixel data (digital data) of an input image as much as the deviation in the electrical properties (or variation) of the driving element sensed for each pixel, thereby compensating the electrical properties deviation (or variation) of the driving element in each of the pixels in real time. The display panel driver may drive the pixels using the external compensation technique and/or then internal compensation technique.

Figure 5:
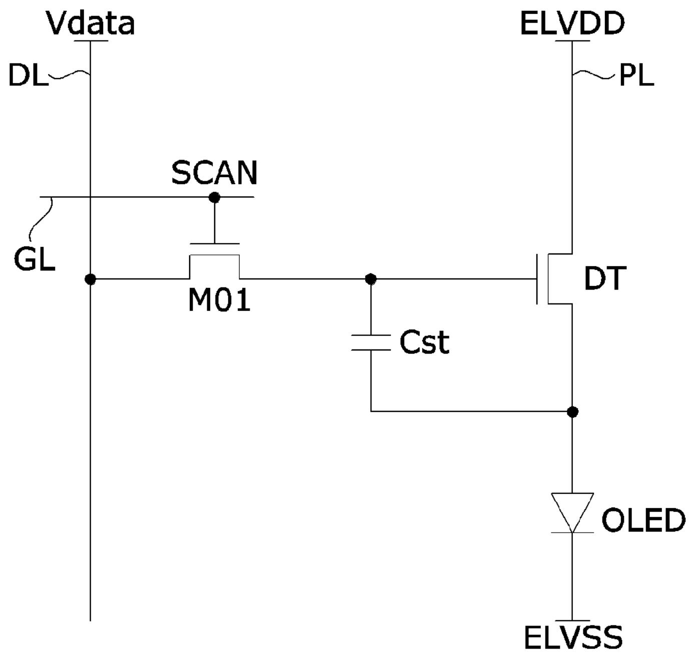
FIGS. 5 to 7 are circuit diagrams showing various pixel circuits applicable to a pixel circuit the present disclosure.
Figure 6:
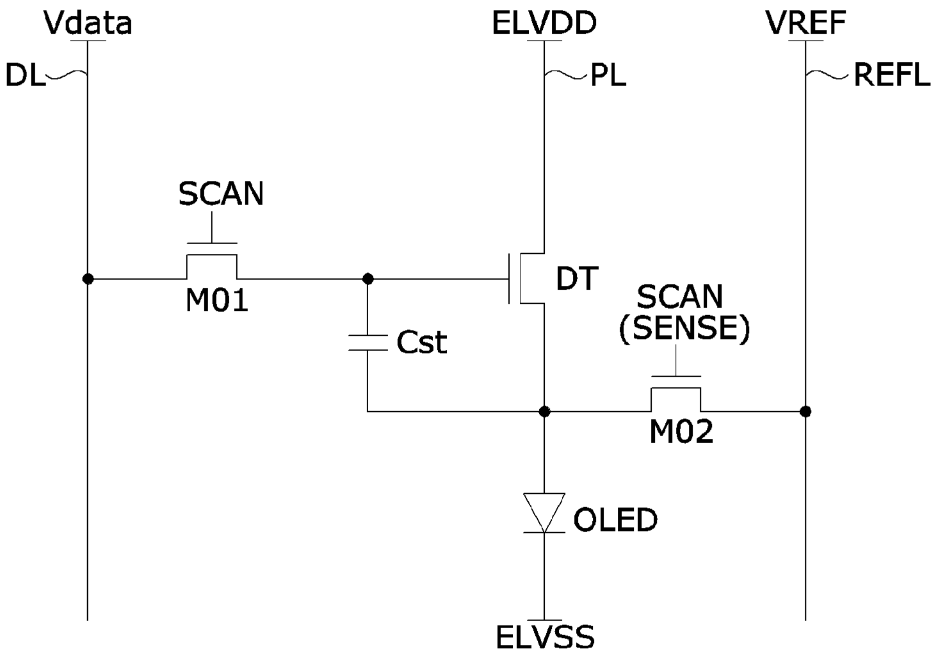
Figure 7:
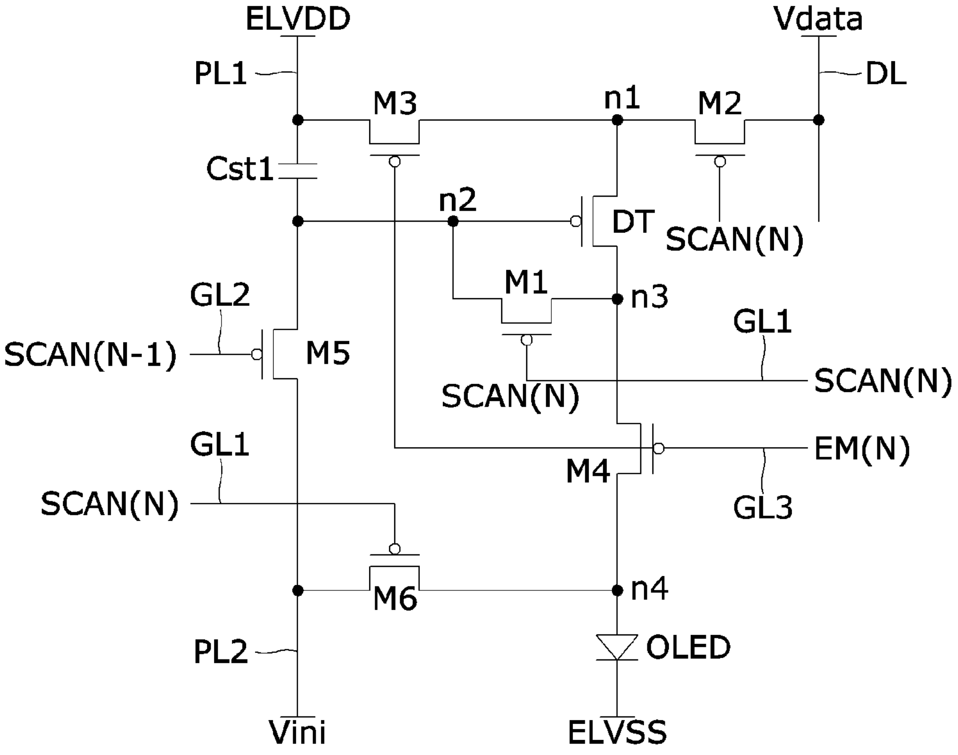

FIGS. 5 to 7 are circuit diagrams showing various pixel circuits applicable to pixel circuit of the present disclosure.

Referring to FIG. 5, the pixel circuit includes a light emitting element OLED, a driving element DT for supplying a current to the light emitting element OLED, a switch element M01 for connecting a data line DL in response to a scan pulse SCAN, and a capacitor Cst connected to the gate of the driving element DT. The driving element DT and the switch element M01 may be implemented with n-channel transistors.

A pixel driving voltage ELVDD is applied to the first electrode of the driving element DT through a power line PL. The driving element DT drives the light emitting element OLED by supplying a current to the light emitting element OLED according to the gate-source voltage Vgs. The light emitting element OLED is turned on and emits light when a forward voltage between the anode electrode and the cathode electrode is greater than or equal to the threshold voltage. The capacitor Cst is connected between the gate electrode and the source electrode of the driving element DT to maintain the gate-source voltage Vgs of the driving element DT.

FIG. 6 is an example of a pixel circuit connected to an external compensation circuit.

Referring to FIG. 6, the pixel circuit further includes a second switch element M02 connected between a reference voltage line REFL and the second electrode (or source) of the driving element DT. In this pixel circuit, the driving element DT and the switch elements M01 and M02 may be implemented as n-channel transistors.

The second switch element M02 applies a reference voltage Vref in response to the scan pulse SCAN or a separate sensing pulse SENSE. The reference voltage VREF is applied to the pixel circuit through the reference voltage line REFL.

In a sensing mode, a current flowing through a channel of the driving element DT or a voltage between the driving element DT and the light emitting element OLED is sensed through the reference line REFL. A current flowing through the reference line REFL is converted into a voltage through an integrator and converted into digital data through an analog-to-digital converter (ADC). This digital data is sensing data including information on a threshold voltage or mobility of the driving element DT. The sensing data is transmitted to a data operation unit. The data operation unit may receive the sensing data from the ADC and add or multiply a compensation value selected based on the sensing data to or by the pixel data, thereby compensating for driving deviation and deterioration of pixels.

Figure 8:
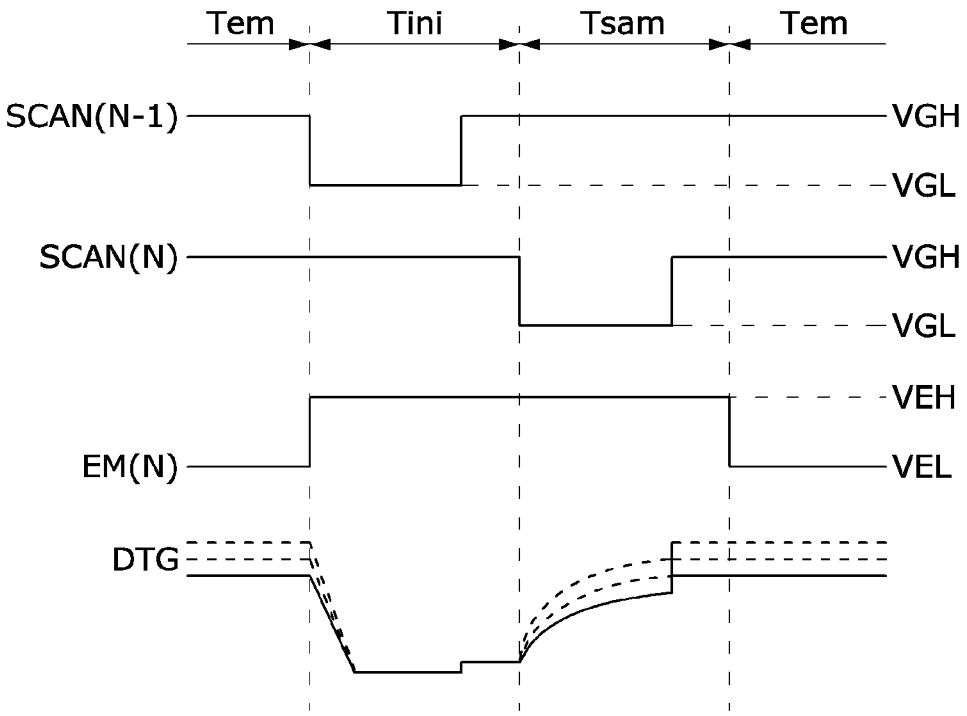
FIG. 8 is a waveform diagram showing a method of driving the pixel circuit shown in FIG. 7 according to an embodiment of the present disclosure.

FIG. 7 is a circuit diagram showing an example of a pixel circuit to which an internal compensation circuit is applied. FIG. 8 is a waveform diagram showing a method of driving the pixel circuit shown in FIG. 7 according to one embodiment.

Referring to FIGS. 7 and 8, the pixel circuit includes the light emitting element OLED, the driving element DT for supplying a current to the light emitting element OLED, and a switch circuit for switching voltages applied to the light emitting element OLED and the driving element DT.

The switch circuit is connected to power lines PL1, PL2, and PL3 to which the pixel driving voltage ELVDD, a low-potential power voltage ELVSS, and an initialization voltage Vini are applied, the data line DL, and gate lines GL1, GL2, and GL3, and switches the voltages applied to the light emitting element OLED and the driving element DT in response to scan pulses SCAN(N−1) and SCAN(N) and an EM pulse EM(N). The switch circuit includes the internal compensation circuit that samples, using a first to a sixth switch elements M1 to M6, a threshold voltage Vth of the driving element DT and applies the data voltage Vdata of the pixel data to the driving element DT. Each of the driving element DT and the switch elements M1 to M6 may be implemented with a p-channel TFT.

Figure 10:
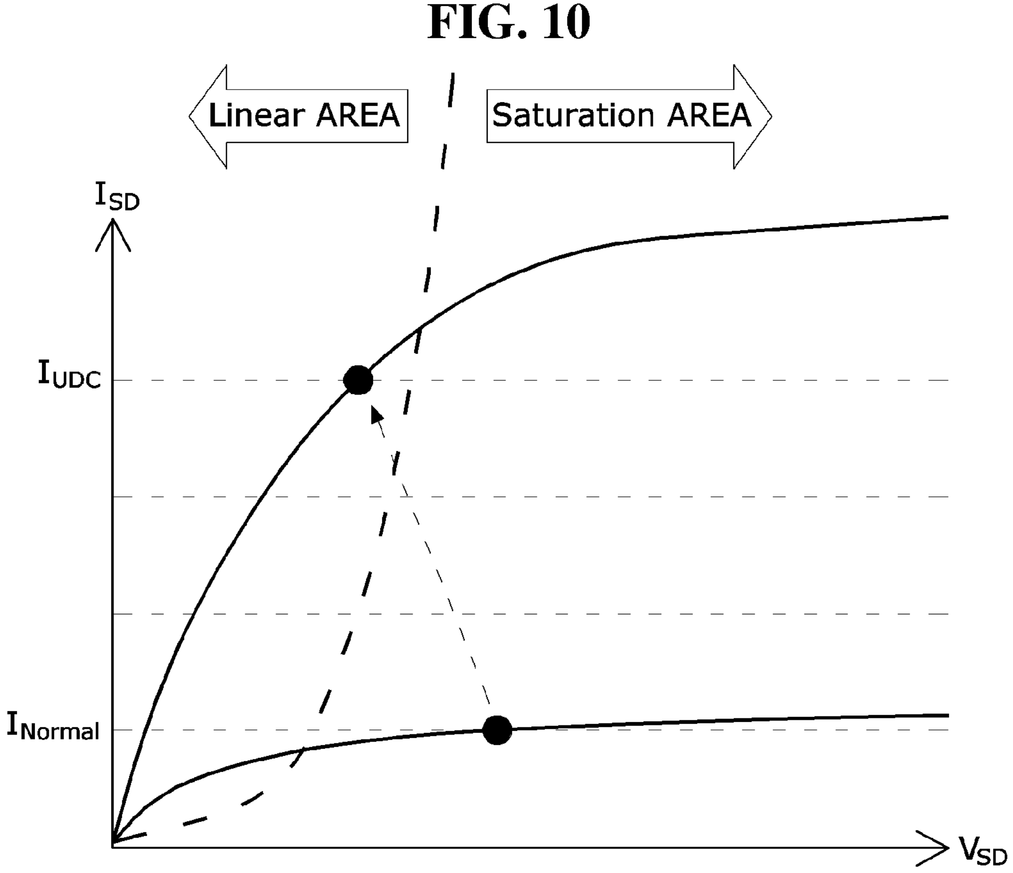
FIG. 10 is a diagram showing operation characteristics of a driving element disposed in a low PPI area when a voltage margin between a pixel driving voltage and a low-potential power voltage is not secured according to an embodiment of the present disclosure.

The driving period of the pixel circuit may be divided, as shown in FIG. 10, into an initialization period Tini, a sampling period Tsam, and a light emission period Tem. The initialization period Tini and the sampling period Tsam are defined in a scan pulse synchronized with the data voltage Vdata.

An $N^{th}$ scan pulse SCAN(N) is generated as the gate-on voltage VGL during the sampling period Tsam and is applied to an $N^{th}$ scan line GL1. The $N^{th}$ scan pulse SCAN(N) is synchronized with the data voltage Vdata that is applied to the pixels on the pixel line. An $(N-1)^{th}$ scan pulse SCAN (N−1) is generated as the gate-on voltage VGL during the initialization period Tini prior to the sampling period and is applied to an $(N-1)^{th}$ scan line GL2. The $(N-1)^{th}$ scan pulse SCAN(N−1) is synchronized with the data voltage Vdata that is generated prior to the $N^{th}$ scan pulse SCAN(N) and is applied to the pixels on an $(N-1)^{th}$ pixel line. The EM pulse EM(N) is generated as the gate-off voltage VGH during the initialization period Tini and the sampling period Tsam, and is applied to an EM line GL3. The EM pulse EM(N) may be simultaneously applied to the pixels on the $(N-1)^{th}$ and the $(N)^{th}$ pixel lines.

During the initialization period Tin, the $(N-1)^{th}$ scan pulse SCAN(N−1) of the gate-on voltage VGL is applied to the $(N-1)^{th}$ scan line GL2, and the EM pulse of the gate-off voltage VGH is applied to the EM line GL3. In this case, the Nth scan line GL1 has the gate-on voltage VGH. During the initialization period Tini, a fifth switch element M5 is turned on in response to the gate-on voltage VGL of the $(N-1)^{th}$ scan pulse SCAN(N−1) to initialize the pixel circuit in the first pixel area DA.

During the sampling period Tsam, the $N^{th}$ scan pulse SCAN(N) of the gate-on voltage VGL is applied to the $N^{th}$ scan line GL1. In this case, the $(N-1)^{th}$ scan line GL2 and the EM line GL3 have the gate-off voltage VGH. During the sampling period Tsam, first and second switch elements M1 and M2 are turned on in response to the gate-on voltage VGL of the $N^{th}$ scan pulse SCAN(N), which results in turning on the driving element DT so that the threshold voltage Vth of the driving element DT is sampled and the data voltage Vdata compensated by the threshold voltage Vth of the driving element DT is stored in the capacitor Cst1. At the same time, a sixth switch element M6 is turned on during the sampling period Tsam to lower the voltage of a fourth node n4 to a reference voltage Vref, thereby suppressing light emission of the light emitting element OLED.

When the light emission period Tem starts, the voltage on the EM line GL3 is inverted to the gate-on voltage VGL. During the light emission period Tem, the scan lines GL1 and GL2 maintain the gate-off voltage VGH. During the light emission period Tem, third and fourth switch elements M3 and M4 are turned on, so that the light emitting element OLED can emits light. During the light emission period Tem, in order to accurately express the luminance of low grayscale, the voltage level of the EM pulse EM(N) may be inverted at a predetermined duty ratio between the gate-on voltage VGL and the gate-off voltage VGH. In this case, the third and fourth switch elements M3 and M4 may repeatedly turn on/off at the duty ratio of the EM pulse EM(N) during the light emission period Tem.

The anode electrode of the light emitting element OLED is connected to the fourth node n4 between the fourth and sixth switch elements M4 and M6. The fourth node n4 is connected to the anode of the light emitting element OLED, the second electrode of the fourth switch element M4, and the second electrode of the sixth switch element M6. The low-potential power voltage ELVSS is applied to the cathode electrode of the light emitting element OLED. The light emitting element OLED emits light by a current $I_D$s flowing according to the gate-source voltage Vgs of the driving element DT. The current path of the light emitting element OLED is switched by the third and fourth switch elements M3 and M4.

The capacitor Cst1 is connected between a ELVDD line PL1 and a second node n2.

After the sampling period Tsam ends, the data voltage Vdata compensated by the sampled threshold voltage Vth of the driving element DT is charged in the capacitor Cst1. Since the data voltage Vdata is compensated by the threshold voltage Vth of the driving element DT in each of the sub-pixels, deviation in the electrical properties of the driving element DT is compensated in the sub-pixels.

The first switch element M1 is turned on in response to the gate-on voltage VGL of the $N^{th}$ scan pulse SCAN(N) to connect the second node n2 to a third node n3. The second node n2 is connected to the gate electrode of the driving element DT, the first electrode of the capacitor Cst1, and the first electrode of the first switch element M1. The third node n3 is connected to the second electrode of the driving element DT, the second electrode of the first switch element M1, and the first electrode of the fourth switch element M4. The gate electrode of the first switch element M1 is connected to the $N^{th}$ scan line GL1 to receive the $N^{th}$ scan pulse SCAN(N). The first electrode of the first switch element M1 is connected to the second node n2, and the second electrode of the first switch element M1 is connected to the third node n3.

Since the first switch element M1 is turned on only for one horizontal period 1H, which is very short, in which the $N^{th}$ scan pulse SCAN(N) is generated as the gate-on voltage VGL in one frame period, a leakage current may occur in the off state. In order to suppress the leakage current in the first switch element M1, the first switch element M1 may be implemented with a transistor having a dual gate structure in which two transistors are connected in series.

The second switch element M2 is turned on in response to the gate-on voltage VGL of the $N^{th}$ scan pulse SCAN(N) to supply the data voltage Vdata to a first node n1. The gate electrode of the second switch element M2 is connected to the $N^{th}$ scan line GL1 to receive the $N^{th}$ scan pulse SCAN (N). The first electrode of the second switch element M2 is connected to the first node n1. The second electrode of the second switch element M2 is connected to the data line DL of the first pixel area DA to which the data voltage Vdata is applied. The first node n1 is connected to the first electrode of the second switch element M2, the second electrode of the third switch element M3, and the first electrode of the driving element DT.

The third switch element M3 is turned on in response to the gate-on voltage VEL of the EM pulse EM(N) to connect the ELVDD line PL1 to the first node n1. The gate electrode of the third switch element M3 is connected to the EM line GL3 to receive the EM pulse EM(N). The first electrode of the third switch element M3 is connected to the ELVDD line PL1. The second electrode of the third switch element M3 is connected to the first node n1.

The fourth switch element M4 is turned on in response to the gate-on voltage VEL of the EM pulse EM(N) to connect the third node n3 to the anode electrode of the light emitting element OLED. The gate electrode of the fourth switch element M4 is connected to the EM line GL3 to receive the EM pulse EM(N). The first electrode of the fourth switch element M4 is connected to the third node n3, and the second electrode thereof is connected to the fourth node n4.

The fifth switch element M5 is turned on in response to the gate-on voltage VGL of the $(N-1)^{th}$ scan pulse SCAN (N−1) to connect the second node n2 to the Vini line PL2. The gate electrode of the fifth switch element M5 is connected to the $(N-1)^{th}$ scan line GL2 to receive the $(N-1)^{th}$ scan pulse SCAN(N−1). The first electrode of the fifth switch element M5 is connected to the second node n2, and the second electrode thereof is connected to the Vini line PL2. In order to suppress a leakage current in the fifth switch element M5, the fifth switch element M5 is implemented with a transistor having a dual gate structure in which two transistors are connected in series.

The sixth switch element M6 is turned on in response to the gate-on voltage VGL of the $N^{th}$ scan pulse SCAN(N) to connect the Vini line PL2 to the fourth node n4. The gate electrode of the sixth switch element M6 is connected to the $N^{th}$ scan line GL1 to receive the $N^{th}$ scan pulse SCAN(N). The first electrode of the sixth switch element M6 is connected to the Vini line PL2, and the second electrode thereof is connected to the fourth node n4.

In another embodiment, the gate electrodes of the fifth and sixth switch elements M5 and M6 may be commonly connected to the $(N-1)^{th}$ scan line GL2 to which the $(N-1)^{th}$ scan pulse SCAN(N−1) is applied. In this case, the fifth and sixth switch elements M5 and M6 may be simultaneously turned on in response to the $(N-1)^{th}$ scan pulse SCAN(N−1).

The driving element DT drives the light emitting element OLED by controlling a current flowing through the light emitting element OLED according to the gate-source voltage Vgs. The driving element DT includes a gate connected to the second node n2, a first electrode connected to the first node n1, and a second electrode connected to the third node n3.

During the initialization period Tini, the $(N-1)^{th}$ scan pulse SCAN(N−1) is generated as the gate-on voltage VGL. The $N^{th}$ scan pulse SCAN(N) and the EM pulse EM(N) maintain the gate-off voltage VGH during the initialization period Tini. Accordingly, during the initialization period Tini, the fifth switch element M5 is turned on, so that the second and fourth nodes n2 and n4 are initialized to Vini. A hold period may be set between the initialization period Tini and the sampling period Tsam. During the hold period, the voltages on the scan lines GL1, GL2 and the EM lines GL3 are the gate-off voltage VGH.

During the sampling period Tsam, the $N^{th}$ scan pulse SCAN(N) is generated as the gate-on voltage VGL. The pulse of the $N^{th}$ scan pulse SCAN(N) is synchronized with the data voltage Vdata of a $N^{th}$ pixel line. The $(N-1)^{th}$ scan pulse SCAN(N−1) and the EM pulse EM(N) maintain the gate-off voltage VEH during the sampling period Tsam. Accordingly, the first and second switch elements M1 and M2 are turned on during the sampling period Tsam.

During the sampling period Tsam, a gate electrode voltage DTG of the driving element DT rises due to a current flowing through the first and second switch elements M1 and M2. When the driving element DT is turned off, the gate electrode voltage DTG is Vdata−|Vth| and a source electrode voltage of the driving element DT is ELVDD−|Vth|. Therefore, when the sampled threshold voltage Vth of the driving element DT is stored in the capacitor Cst1, the gate-source voltage Vgs of the driving element DT is ELVDD−Vdata. As a result, the current Ioled flowing through the light emitting element OLED during the light emission period Tem is not affected by the threshold voltage Vth of the driving device DT.

During the light emission period Tem, when the EM pulse EM(N) is the gate-on voltage VEL, a current flows between ELVDD and the light emitting element OLED, so that the light emitting element OLED may emit light. During the light emission period Tem, the $(N-1)^{th}$ and $N^{th}$ scan pulses SCAN(N−1) and SCAN(N) maintain the gate-off voltage VGH. During the light emission period Tem, the third and fourth switch elements M3 and M4 are turned on according to the gate-on voltage VEL of the EM pulse EM(N). When the EM pulse EM(N) is the gate-on voltage VEL, the third and fourth switch elements M3 and M4 are turned on, so that a current flows through the light emitting element OLED. At this time, the current Ioled flowing through the driving element DT to the light emitting element OLED is expressed as $Ioled=K(ELVDD-Vdata)^2$. K is a constant value determined by charge mobility, parasitic capacity, channel ratio (W/L) and the like of the driving element DT.

Since the PPI of the second pixel area CA is less than that of the first pixel area DA, the amount of current per unit pixel is larger than that of the first pixel area DA. Accordingly, when pixel data having the same grayscale value is written to the pixel of the first pixel area DA and the pixel of the second pixel area CA, the source-drain current ISD of the driving element DT disposed in the second pixel area CA is higher than that of the driving element DT disposed in the first pixel area DA.

The PPI of the second pixel area CA may be ¼ of that of the first pixel area DA. In this case, the amount of current per unit pixel in the second pixel area CA is 4 times that of the first pixel area DA. In this case, if a voltage margin between the pixel driving voltage ELVDD and the low-potential power voltage ELVSS is not secured, the driving element DT may operate in a linear area. Hereinafter, the "voltage margin between the pixel driving voltage ELVDD and the low-potential power voltage ELVSS" is abbreviated as the ELVDD-ELVSS margin.

Figure 9:
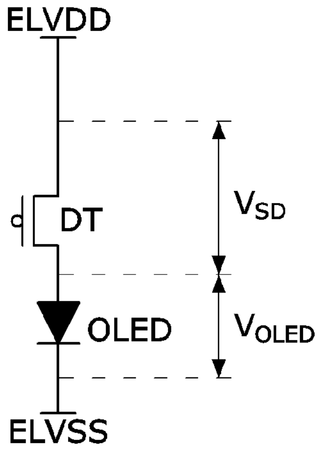
FIG. 9 is a diagram showing a source-drain voltage of a driving element according to an embodiment of the present disclosure.

As shown in FIGS. 9 and 10, when the driving element DT disposed in the second pixel area CA does not operate in the saturation area but operates in the linear area, even when fluctuation of the source-drain voltage VSD of the driving element DT is small, the source-drain current $I_{SD}$ flowing to the light emitting element OLED through the channel of the driving element DT changes rapidly, so that the luminance of the light emitting element OLED may change. In this case, since the luminance in the second pixel area CA varies for each location, the image quality deteriorates. In FIG. 9, "$V_{OLED}$" is a voltage applied across the light emitting element OLED. In FIG. 10, "$I_{NORMAL}$" is a source-drain current $I_{SD}$ of the driving element DT disposed in the first pixel area DA. "$I_{UDC}$" is the source-drain current $I_{SD}$ of the driving element DT disposed in the second pixel area CA.

When the pixel driving voltage ELVDD commonly applied to the pixels of the pixel array is increased or the low-potential power voltage ELVSS is decreased, the ELVDD-ELVSS margin of the second pixel area CA can be secured, but power consumption increases.

In the present disclosure, in order to secure the ELVDD-ELVSS margin of the low PPI area having a high current amount, that is, the second pixel area CA, as shown in FIG.

11, the cathode electrode is separated for each area and the low-potential power voltage ELVSS applied to the second pixel area CA is lowered.

Figure 11:
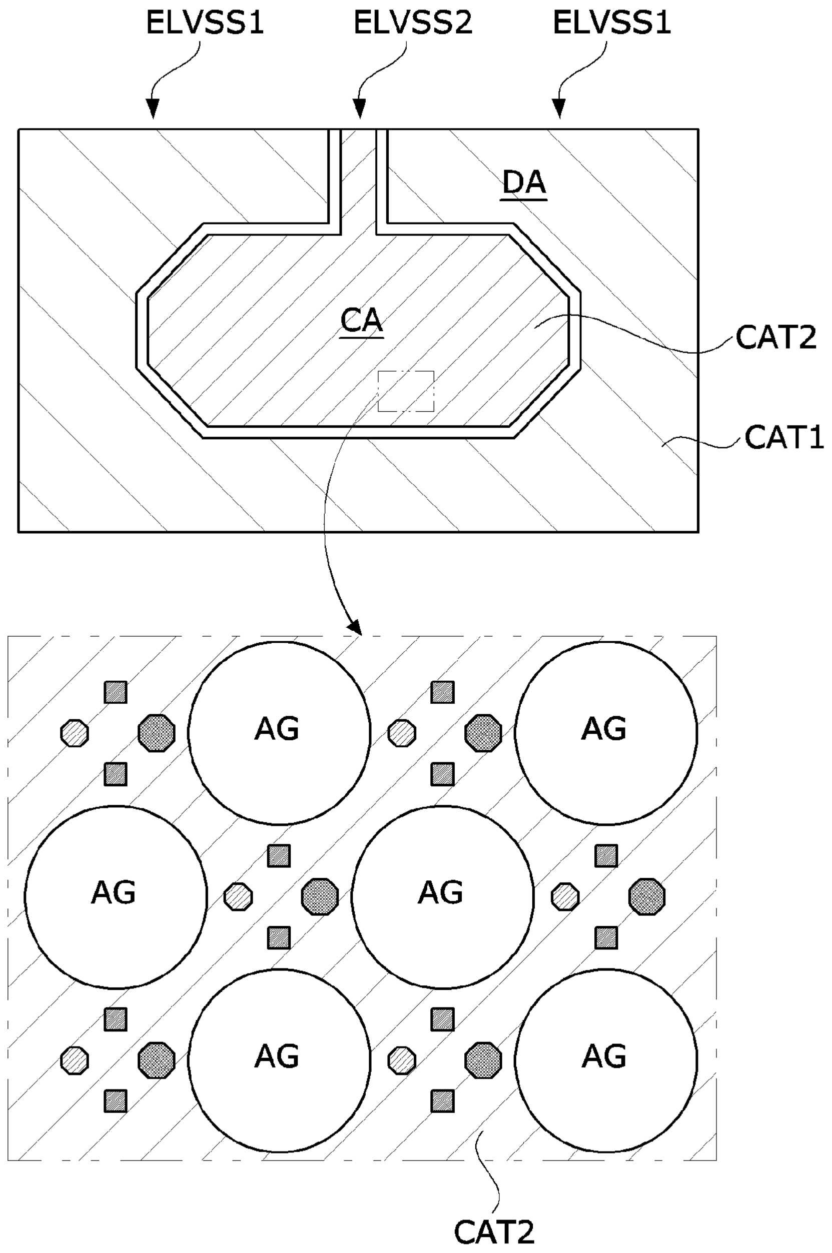
FIG. 11 is a diagram illustrating an example in which a cathode electrode of a light-emitting element is separated between a low PPI area and a high PPI area so that an independent low-potential power voltage is applied to pixels for each area according to an embodiment of the present disclosure.

FIG. 11 is a diagram illustrating an example in which a cathode electrode of a light-emitting element is separated between a low PPI area and a high PPI area so that an independent low-potential power voltage is applied to pixels for each area according to one embodiment.

Referring to FIG. 11, the first pixel area DA includes a first cathode electrode CAT1. The first cathode electrode CAT1 is commonly connected to the light-emitting elements OLED of pixels disposed in the first pixel area DA. The first low-potential power voltage ELVSS1 is applied to the first cathode electrode CAT1.

The second pixel area CA includes the second cathode electrode CAT2. The second cathode electrode CAT2 is separated from the second cathode electrode CAT2. Accordingly, the first cathode electrode CAT1 and the second cathode electrode CAT2 may apply low-potential power voltages ELVSS1 and ELVSS2 having different voltage levels to the pixels for each area.

Figure 12:
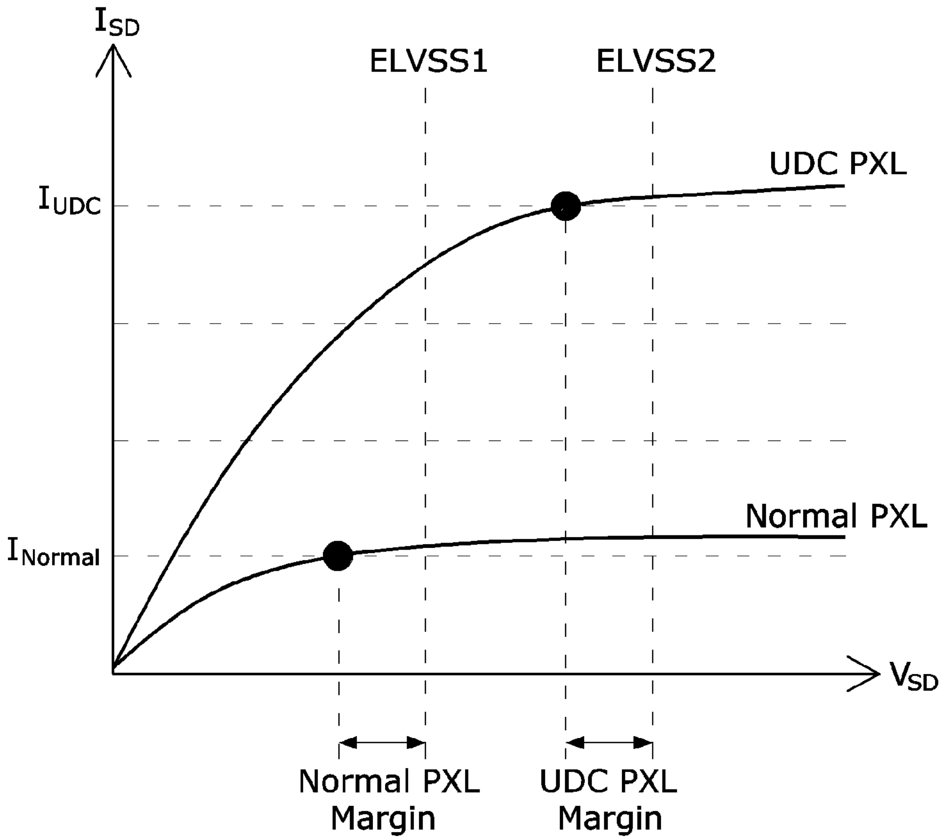
FIG. 12 is a diagram showing characteristics of a driving element disposed in a low PPI area when a voltage margin between a pixel driving voltage and a low-potential power voltage is secured by lowering the low-potential power voltage applied to the pixels of the low PPI area according to an embodiment of the present disclosure.

The second cathode electrode CAT2 is commonly connected to the light emitting elements OLED of pixels disposed in the second pixel area CA. The second low-potential power voltage ELVSS2 is connected to the second cathode electrode CAT2. The second low-potential power voltage ELVSS2 is set to a voltage lower than the first low-potential power voltage ELVSS1 to increase the ELVDD-ELVSS voltage margin of the second pixel area CA. As a result, the driving element DT of the second pixel area CA may operate in the saturation area as illustrated in FIG. 12. In FIG. 12, "Normal PXL" is a pixel of the first pixel area DA, and "UDC PXL" is a pixel of the second pixel area CA. "Normal PXL Margin" is the ELVDD-ELVSS1 margin of the first pixel area DA, and the "UDC PXL Margin" is the ELVDD-ELVSS2 margin of the second pixel area CA. Dot is a pinch-off voltage. In order to increase the luminance of the second pixel area CA, the gate-source voltage Vgs of the driving element DT may be increased. When the gate-source voltage Vgs of the driving element DT increases, the current amount ISD of the driving element DT increases and the pinch-off voltage increases.

The first and second cathode electrodes CAT1 and CAT2 may be formed of the same electrode material. Since the cathode electrodes CAT1 and CAT2 are separated for each area of the pixel array DA and CA, the cathode electrodes CAT1 and CAT2 may be formed of different materials. For example, the second cathode electrode CAT2 may be formed of an electrode material having a higher light transmittance than the first cathode electrode CAT1 in order to increase the transmittance of the second pixel area CA. In this case, the second cathode electrode CAT2 has a higher transmittance than the first cathode electrode CAT1.

The display panel 100 may further include a VSS line 101 connected to the second cathode electrode CAT. The VSS line 101 may be connected to the second cathode electrode CAT2 across the first pixel area DA. The VSS line 101 may be formed of a metal having low resistance on the display panel 100.

Figure 13:
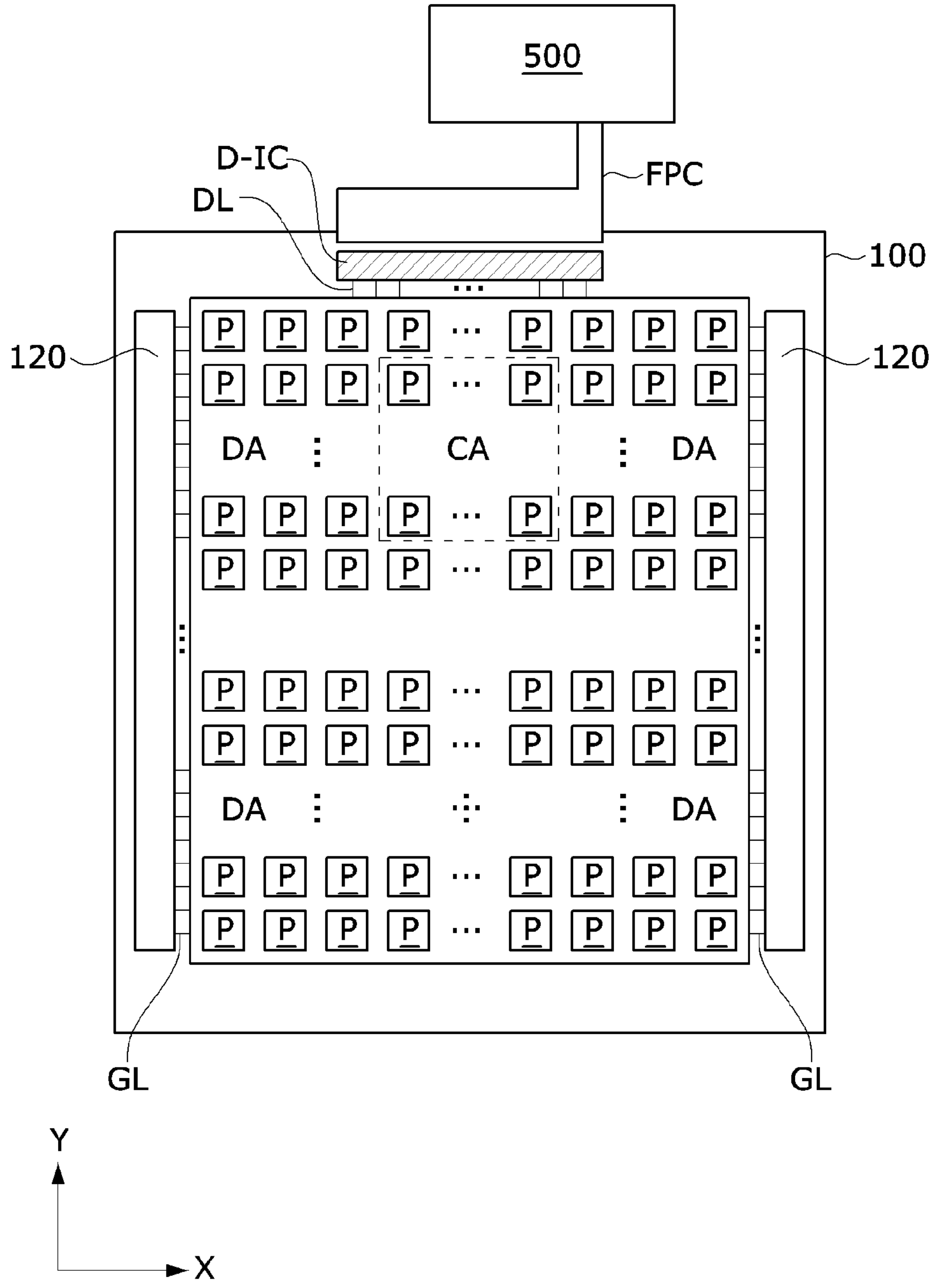
FIG. 13 is a block diagram showing a display panel and a display panel driver according to an embodiment of the present disclosure.
Figure 14:
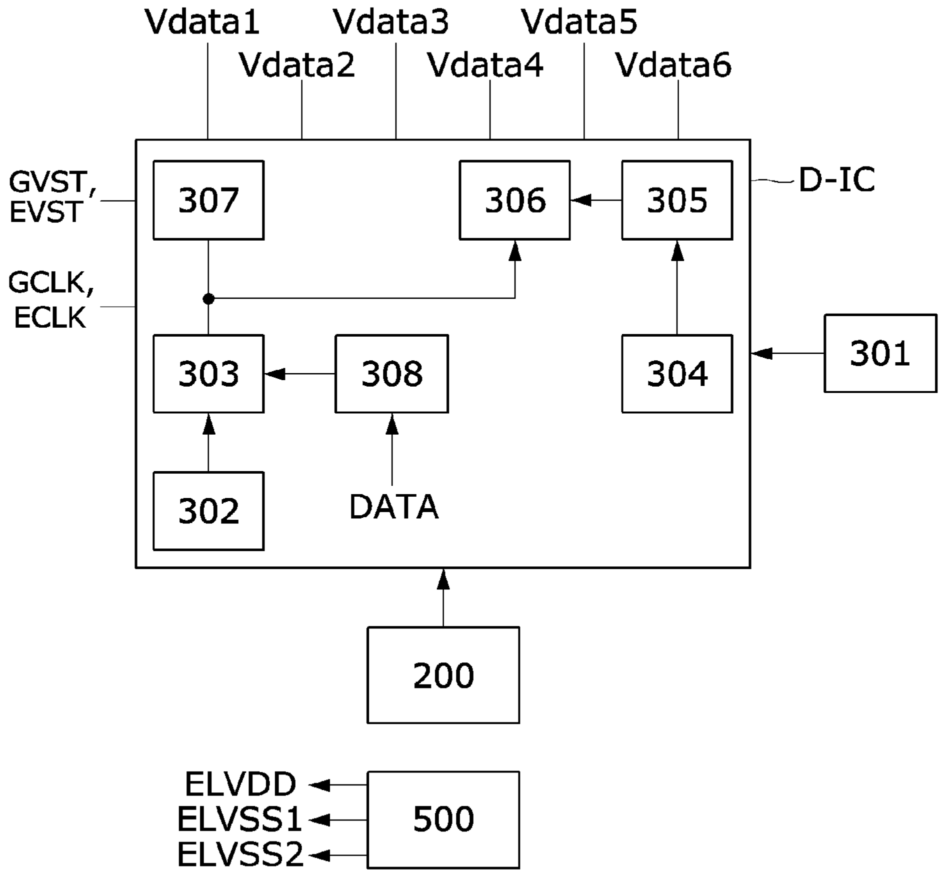
FIG. 14 is a block diagram showing a configuration of a drive IC and an output voltage of an external power supply unit according to an embodiment of the present disclosure.

FIG. 13 is a block diagram showing a display panel and a display panel driver according to an example of the present disclosure. FIG. 14 is a block diagram showing the configuration of the drive IC and an output voltage of an external power supply shown in FIG. 13 according to an example of the present disclosure.

Referring to FIGS. 13 and 14, the display device includes a display panel 100 in which a pixel array is disposed on a screen, a display panel driver, an external power supply unit 500, and the like.

The pixel array DA and CA of the display panel 100 include data lines DL, gate lines GL crossing the data lines DL, and pixels P arranged in a matrix form defined by the data lines DL and the gate lines GL. The pixel array DA and CA further include power lines such as the ELVDD line PL1, the Vini line PL2, and the VSS line 101 shown in FIG. 17.

The pixel array DA and CA may be divided into a circuit layer 12 and a light emitting element layer 18 as shown in FIG. 1. A touch sensor array may be disposed on the light emitting element layer 18. Each of the pixels of the pixel array DA and CA may include two to four sub-pixels as described above. Each of the sub-pixels includes a pixel circuit disposed on the circuit layer 12.

The second pixel area CA in the pixel array DA and CA includes the light transmitting portions AG. A sensor module SS1 facing the second pixel area CA is disposed under the rear surface of the display panel 100 as shown in FIG. 1.

The display panel driver writes pixel data of the input image to the pixels P. The pixels P include a plurality of sub-pixels.

The display panel driver includes a data driver 306 that supplies a data voltage of pixel data to the data lines DL, and a gate driver 120 that sequentially supplies a gate pulse to the gate lines GL. The data driver 306 may be integrated into a drive IC D-IC as shown in FIG. 14. The display panel driver may further include a touch sensor driver omitted from the drawing.

The drive IC D-IC may be adhered to the display panel 100. The drive IC D-IC receives pixel data and timing signals of an input image from the host system 200, supplies a data voltage of the pixel data to the pixels, and lets the data driver 306 and the gate driver 120 to be synchronized.

The drive IC D-IC is connected to the data lines DL through data channels to supply a data voltage of pixel data to the data lines DL. The drive IC D-IC may output a gate timing signal for controlling the gate driver 120 through gate timing signal output channels. The gate timing signal generated from the timing controller 303 may include a start pulse (Gate start pulse, VST), a shift clock (Gate shift clock, CLK), and the like. The start pulse VST and the shift clock CLK swing between the gate-on voltage VGL and the gate-off voltage VGH. The gate timing signals VST and CLK output from the level shifter 307 are applied to the gate driver 120 to control the shift operation of the gate driver 120.

The gate driver 120 may include a shift register formed on a circuit layer of the display panel 100 together with a pixel array. The shift register of the gate driver 120 sequentially supplies gate signals to the gate lines GL under the control of the timing controller 303. The gate signal may include a scan pulse and an EM pulse of a light emission signal. The gate driver 120 may include a scan driver that outputs the scan pulse and an EM driver that outputs the EM pulse. In FIG. 14, GVST and GCLK are gate timing signals input to the scan driver. EVST and ECLK are gate timing signals input to the EM driver.

The drive IC D-IC may be connected to the host system 200, the first memory 301, and the display panel 100. The drive IC D-IC may include a data receiving and operation unit 308, a timing controller 303, a data driver 306, a gamma compensation voltage generating unit 305, an internal power supply unit 304, a second memory 302, etc.

The data receiving and operation unit 308 includes a receiving unit for receiving pixel data input as a digital signal from the host system 200 and a data operation unit that processes pixel data input through the receiving unit to improve image quality. The data operation unit may include a data restoration unit that decodes and restores compressed pixel data, and an optical compensation unit that adds a preset optical compensation value to the pixel data. The optical compensation value may be set as a value for correcting the luminance of each pixel data based on the luminance of the screen measured based on the camera image captured in the manufacturing process.

The timing controller 303 provides pixel data of an input image received from the host system 200 to the data driver 306. The timing controller 303 generates a gate timing signal for controlling the gate driver 120 and a source timing signal for controlling the data driver 306 to control the operation timing of the gate driver 120 and the data driver 306.

The data driver 306 converts digital data including pixel data received from the timing controller 303 through a digital to analog converter (DAC) into a gamma compensation voltage and outputs a data voltage. The data voltage output from the data driver 306 is supplied to the data lines DL of the pixel array DA and CA through an output buffer connected to the data channel of the drive IC D-IC.

The gamma compensation voltage generator 305 divides the gamma reference voltage from the power supply unit 304 through a voltage divider circuit to generate a gamma compensation voltage for each gray level. The gamma compensation voltage is an analog voltage in which a voltage is set for each gray level of pixel data. The gamma compensation voltage output from the gamma compensation voltage generator 305 is provided to the data driver 306.

The internal power supply unit 304 generates power required for driving the pixel array of the display panel 100, the gate driver 120, and the drive IC D-IC using a DC-DC converter. The DC-DC converter may include a charge pump, a regulator, a buck converter, a boost converter, and the like. The power supply unit 304 receives a DC voltage from the host system 200 to generate DC power, such as a gamma reference voltage, gate-on voltages VGL and VEL, gate-off voltages VGH and VEH, initialization voltage Vini, and the like. The gamma reference voltage is supplied to the gamma compensation voltage generator 305. The gate-on voltages VGL and VEL and the gate-off voltages VGH and VEH are supplied to the level shifter 307 and the gate driver 120. The initialization voltage Vini is commonly supplied to the pixels P of the pixel array DA and CA through the Vini line PL3. The initialization voltage Vini is set to a DC voltage lower than the pixel driving voltage VDD and lower than the threshold voltage of the light emitting element OLED to initialize main nodes of the pixel circuits and suppress the light emission of the light emitting element OLED.

The second memory 302 stores a compensation value, register setting data, and the like received from the first memory 301 when power is supplied to the drive IC D-IC. The compensation value can be applied to various algorithms with improved image quality. The compensation value may include an optical compensation value. The register setting data defines the operation of the data driver 306, the timing controller 303, the gamma compensation voltage generator 305, and the like. The first memory 301 may include a flash memory. The second memory 302 may include a static RAM (SRAM).

The host system 200 may be implemented by an application processor (AP). The host system 200 may transmit pixel data of an input image to a drive IC D-IC through a mobile industry processor interface (MIPI). The host system 200 may be connected to a drive IC D-IC through a flexible printed circuit, for example, a flexible printed circuit (FPC). The host system 200 is not limited to mobile devices. For example, the host system 200 may be a main circuit board such as a television (TV) system, a set-top box, a navigation system, a personal computer (PC), a vehicle system, a home theater system, and the like. The host system 200 and the external power supply unit 500 may be connected to the display panel 100 through a flexible circuit board, for example, the flexible printed circuits (FPC).

Meanwhile, the display panel 100 may be implemented by a flexible panel applicable to a flexible display. The flexible display can be changed in size by winding, folding and bending the flexible panel, and can be easily manufactured in various designs. The flexible display may be implemented by a rollable display, a foldable display, a bendable display, a slideable display, or the like. Flexible panels can be made of so-called "plastic OLED panels". A plastic OLED panel may include a back plate and an array of pixels on an organic thin film bonded on the back plate. A touch sensor array may be formed on the pixel array.

The back plate may be a polyethylene terephthalate (PET) substrate. A pixel array and a touch sensor array may be formed on the organic thin film. The back plate can block moisture permeation toward the organic thin film so that the pixel array is not exposed to humidity. The organic thin film may be a polyimide (PI) substrate. A multi-layered buffer layer may be formed of an insulating material not shown on the organic thin film. The circuit layer 12 and the light emitting element layer 14 may be stacked on the organic thin film.

The external power supply unit 500 may supply the pixel driving voltage ELVDD and the low-potential power voltages ELVSS1 and ELVSS2 to the pixel array DA and CA of the display panel 100 through the flexible circuit board (FPC). The external power supply unit 500 may be implemented by a power management integrated circuit (PMIC).

The pixel driving voltage ELVDD is applied with the same voltage to all of the pixels of the pixel array DA and CA. The driving voltages Vdata, VGH/VEH, VGL/VEL, and Vini of the pixels are set based on the pixel driving voltage ELVDD. The low-potential power voltages ELVSS1 and ELVSS2 are the pixel driving voltage ELVDD and the low voltage. The second low-potential power voltage ELVSS2 is set to a voltage lower than the first low-potential power voltage ELVSS1. All of the driving elements DT of the pixel array DA and CA are turned on in the saturation area DT to supply current to the light emitting element OLED.

Figure 15:
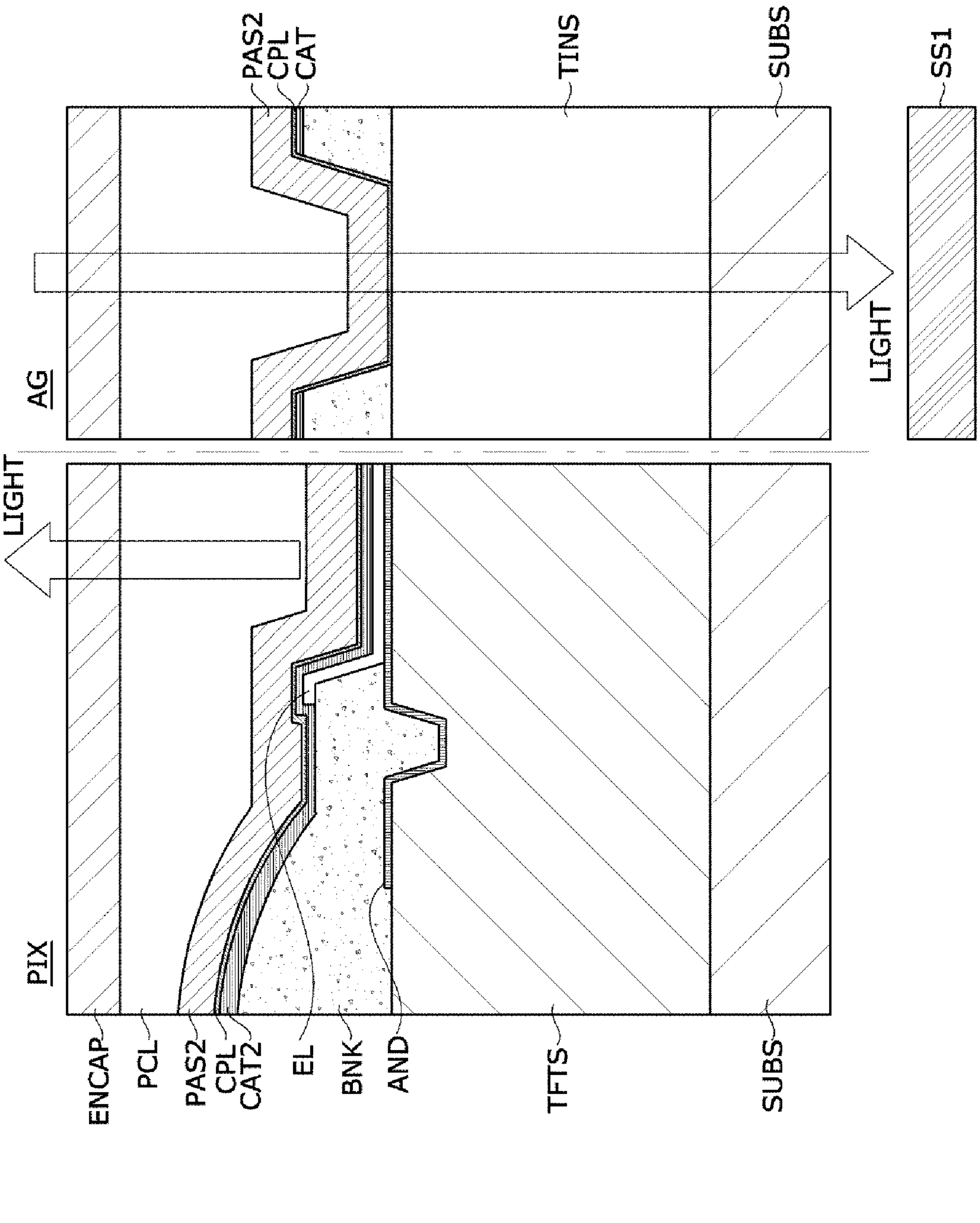
FIG. 15 is a cross-sectional view showing in detail a cross-sectional structure of a low PPI area in a display panel according to an embodiment of the present disclosure.

FIG. 15 is a cross-sectional view showing in detail a cross-sectional structure of a low PPI area in a display panel according to one embodiment. In FIG. 15, "PIX" is a pixel area of the second pixel area CA, and "AG" is a light transmitting portion. The sensor module SS1 is disposed under the light transmitting portion AG.

Referring to FIG. 15, a circuit layer TFTS is formed on a substrate SUBS, and a light emitting element layer is formed thereon. The circuit layer TFTS includes a pixel circuit, a signal line and a power line connected to the pixel circuit, and the like. The light transmitting portion AG includes insulating layers INS connected to the insulating layers of the circuit layer TFTS.

The anode electrode AND of the light emitting element OLED may be connected to the driving element DT of the pixel circuit. The anode electrode AND may be made of a transparent or translucent electrode material.

The pixel defining layer BNK may cover the anode electrode AND of the light emitting element OLED. The pixel defining layer BNK defines a light emitting area (or an opening area) through which light passes from each of the pixels to the outside. A spacer may be formed on the pixel defining layer BNK. The pixel defining layer BNK and the spacer may be integrated with the same organic insulating material. The spacer secures a gap between a fine metal mask (FMM) and the anode electrode AND so that the FMM does not contact the anode electrode AND in the deposition process of an organic compound layer EL.

The organic compound layer EL is formed in the light emission area of each of the pixels defined by the pixel defining layer BNK. The cathode electrode CAT2 of the light emitting element OLED is formed in the second pixel area CA to cover the pixel defining layer BNK, the spacer SPC, and the organic compound EL. The cathode electrode CAT2 is connected to the VSS line 101. The VSS line 101 may be formed of the same electrode material as the cathode electrode CAT2 on the same layer as the cathode electrode CAT2. In addition, the VSS line 101 may be formed in a low resistance metal pattern in the circuit layer TFTS and connected to the cathode electrode CAT2. The low-resistance metal pattern may be connected to the cathode electrode CAT2 of the second pixel area CA through a contact hole passing through the circuit layer TFTS and the insulating layers of the light emitting element layer.

The capping layer CPL may cover the cathode electrode CAT2. The capping layer CPL is formed of an inorganic insulating material to protect the cathode electrode CAT2 by blocking the penetration of air and out gassing of the organic insulating material applied on the capping layer CPL. The inorganic insulating layer PAS2 may cover the capping layer CPL, and a planarization layer PCL may be formed on the inorganic insulating layer PAS2. The planarization layer PCL may include an organic insulating material. An inorganic insulating layer of the encapsulation layer ENCAP may be formed on the planarization layer PCL.

FIGS. 16, 17, 18, 19A, 19B, 19C, and 19*d* are diagrams showing various connection structures between an external power supply unit and a pixel array according to one embodiment. In FIGS. 16, 17, 18, 19A, 19B, 19C, and 19*d*, the pixel driving voltage ELVDSS is omitted.

Figure 16:
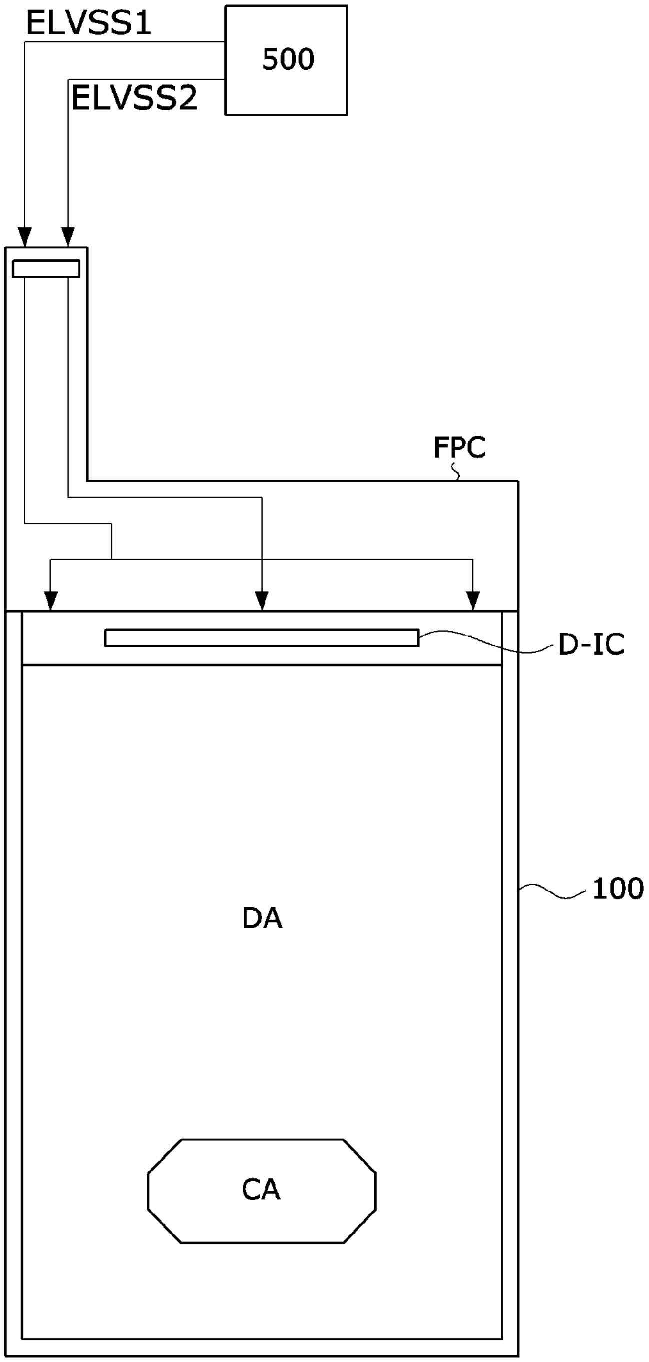
FIGS. 16, 17, 18, 19A, 19B, 19C, and 19D are diagrams showing various connection structures between an external power supply unit and a pixel array according to an embodiment of the present disclosure.

Referring to FIG. 16, the external power supply unit 500 includes a first VSS channel outputting a first low-potential power voltage ELVSS1 and a second VSS channel outputting a second low-potential power voltage ELVSS2. The first low-potential power voltage ELVSS1 is applied to the first cathode electrode CAT1 of the first pixel area DA through the flexible circuit board FPC. The flexible circuit board FPC includes a wiring to which the first low-potential power voltage ELVSS1 is applied and a wiring to which the second low-potential power voltage ELVSS2 is applied.

The second low-potential power voltage ELVSS2 is applied to the second cathode electrode CAT2 of the second pixel area CA through the flexible circuit board FPC.

Figure 17:
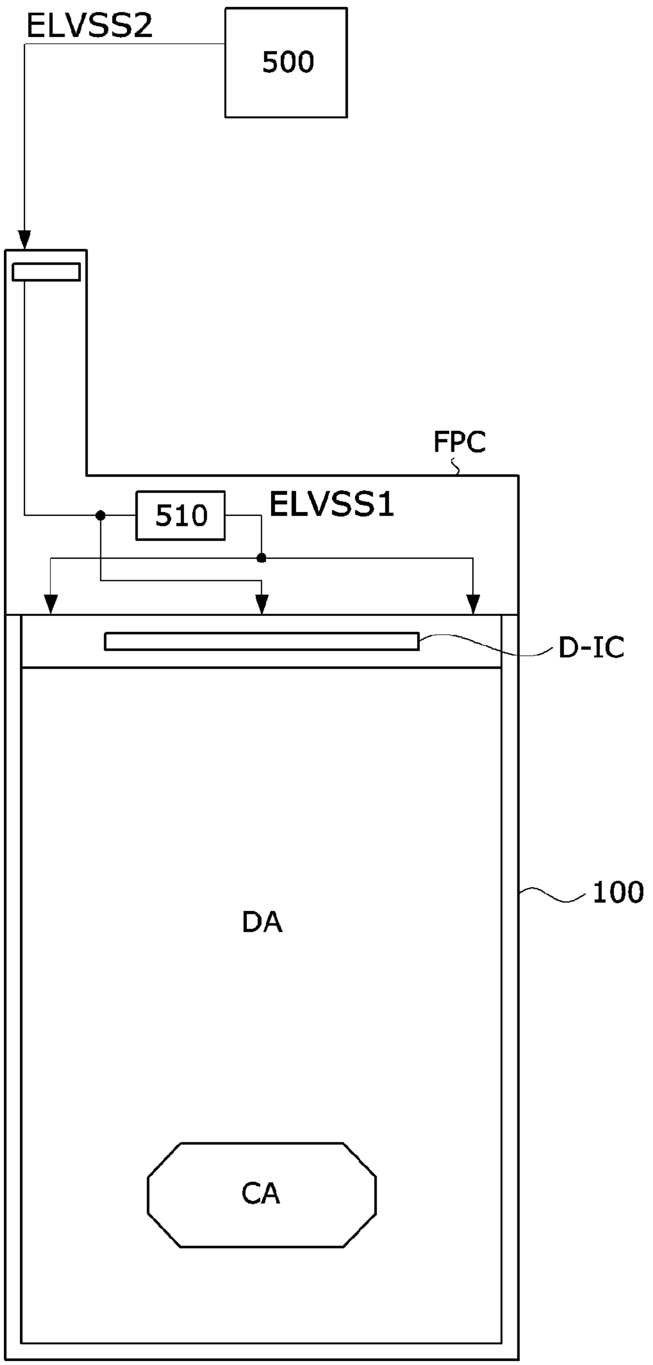

Referring to FIG. 17, the external power supply unit 500 includes a VSS channel for outputting a second low-potential power voltage ELVSS2. The second low-potential power voltage ELVSS2 is applied to the second cathode electrode CAT2 of the second pixel area CA through the flexible circuit board FPC. In addition, the second low-potential power voltage ELVSS2 is applied to the adder 510 formed on the flexible circuit board FPC. The adder 510 increases the input voltage ELVSS2 and outputs the first low-potential power voltage ELVSS1.

Figure 18:
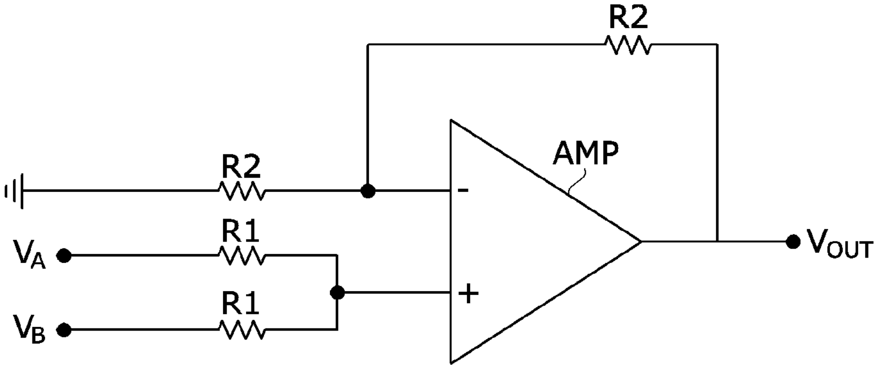

The adder 510 may be implemented by a circuit in which an operational amplifier AMP and resistors R1 and R2 are combined as shown in FIG. 18. The resistor R1 to which the first input voltage VA is applied and the resistor R2 to which the second input voltage VB is applied are input in parallel to the non-inverting input terminal (+) of the operational amplifier AMP. The first input voltage VA may be the second low-potential power voltage ELVSS2 from the external power supply unit 500. The second input voltage VB may be a DC voltage generated from the internal power supply unit 304 of the drive IC D-IC, for example, initialization voltage Vini, but is not limited thereto. The resistor R2 connected to the ground voltage source GND is connected to the inverting input terminal (−) of the operational amplifier AMP. The feedback resistor R2 is connected between the inverting input terminal (−) and the output terminal of the operational amplifier AMP. The output voltage of the adder 510 is expressed as Vout=VA+VB. Accordingly, the adder 510 boosts the second low-potential power voltage ELVSS2 to output the first low-potential power voltage ELVSS2. The first low-potential power voltage ELVSS1 output from the adder 510 is applied to the first cathode electrode CAT1 of the first pixel area DA.

Figure 19A:
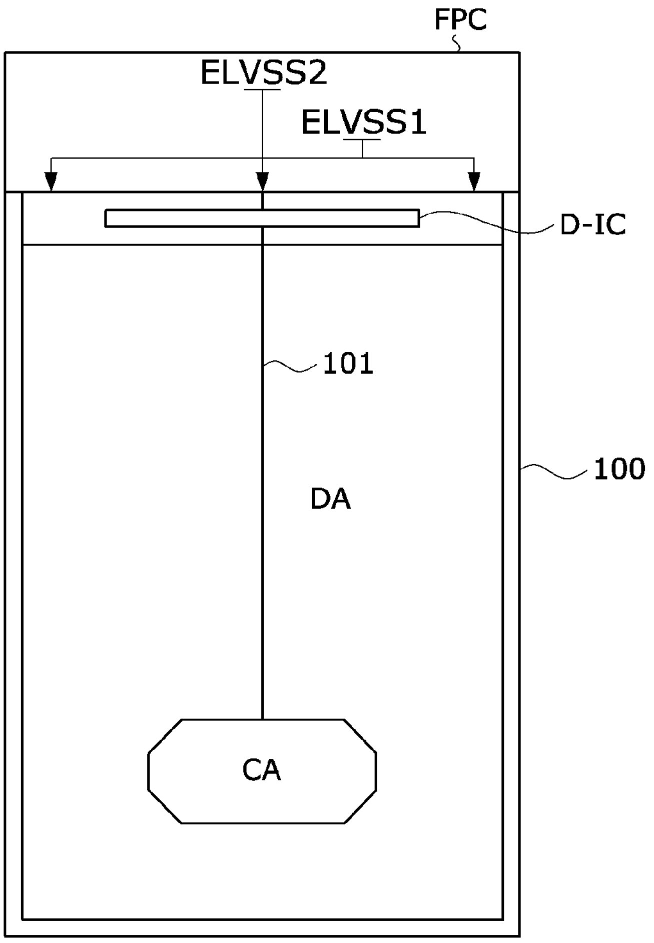
Figure 19B:
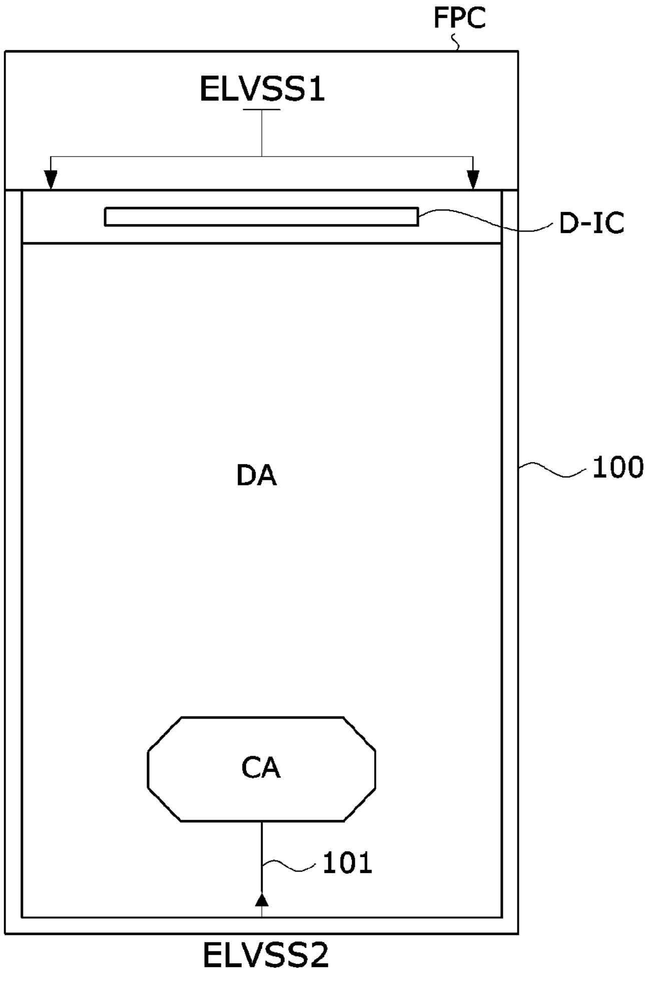
Figure 19C:
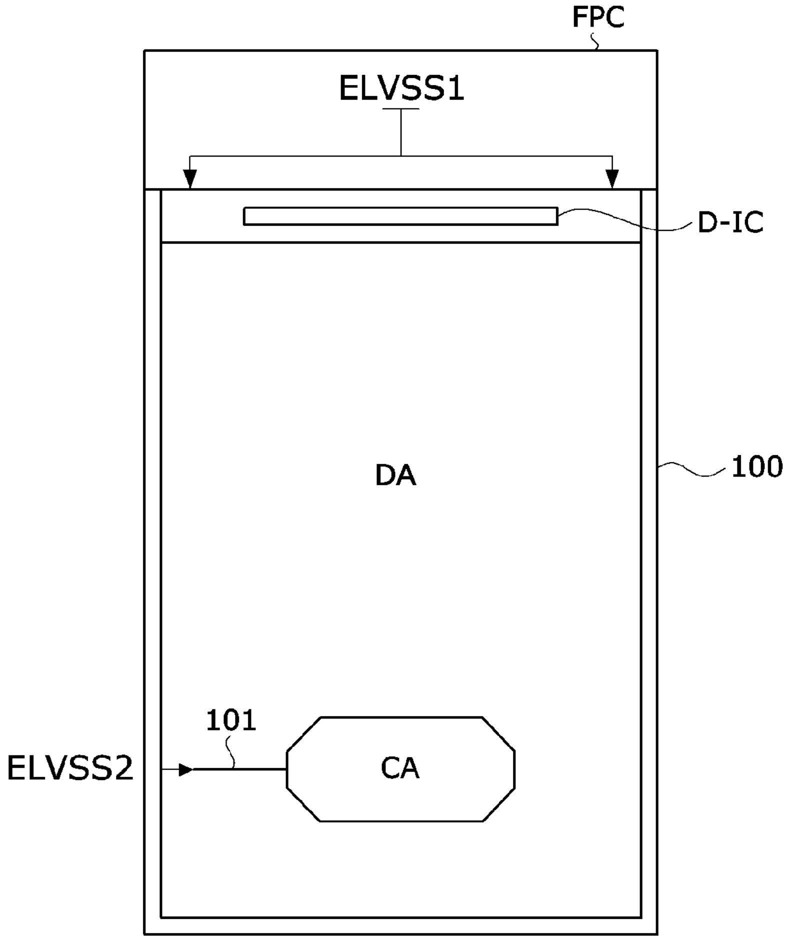
Figure 19D:
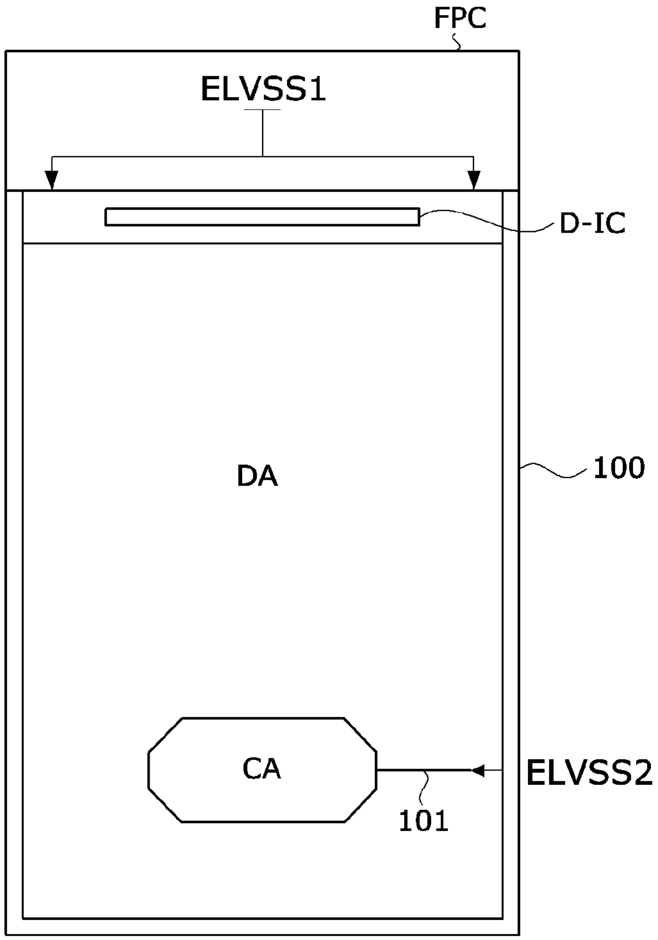

The VSS line 101 connected to the second cathode electrode CAT2 may vary according to the position of the second pixel area CA on the screen of the display panel 100. As shown in FIG. 19A, it may be disposed at the lower end of the display panel 100 far from the drive IC D-IC. In this case, the VSS line 101 may pass under the drive IC D-IC on the display panel 100, and may be connected to the second cathode electrode CAT2 of the second pixel area CA across the first pixel area DA. As shown in FIGS. 19B to 19D, the VSS line 101 may bypass the pixel array DA and CA and include routing wiring formed along the edge bezel of the display panel 100, and may be connected to the second cathode electrode CAT2 of the second pixel area CA across the first pixel area DA.

In the present disclosure, as in the above-described embodiments, the cathode electrodes CAT1 and CAT2 of the pixel array DA and CA are separated for each area, and the low-potential power voltages ELVSS1 and ELVSS2 are applied at different voltages for each area. Meanwhile, in order to secure the ELVDD-ELVSS margin of the second pixel area CA, a method of separating the VDD line to which the pixel driving voltage is applied for each area may be considered, but there are the following problems.

The pixel driving voltage ELVDD is a reference voltage for setting the voltage level of the driving voltages Vdata, Vini, ELVSS, VGH/VEH, and VGL/VEL applied to the pixels. When the pixel driving voltage (ELVDD) is set to a different voltage for each area, the reference voltage of the pixels varies, so all of the driving voltages Vdata, Vini, ELVSS, VGH/VEH, and VGL/VEL of the pixels may be changed based on the pixel driving voltage ELVDD. Especially, since the data voltage Vdata may be out of the output voltage range of the drive IC (D-IC), the data voltage cannot be applied to the pixels of the first pixel area DA and the pixels of the second pixel area CA through the same data channel of the drive IC (D-IC). In this case, since data channels having different voltage ranges for each area are required in the drive IC (D-IC), the number of data channels of the drive IC is further required, and the drive IC needs to be separated for each area.

When the VDD line of the display panel 100 is formed in a structure in which two metal pattern layers are connected in a mesh shape through a contact hole passing through the insulating layer, the pixel driving voltage may be stably supplied to all of the pixels of the pixel array DA and CA. When the VDD line is separated for each area of the pixel array DA and CA, the VDD line may be formed on the display panel 100 by using vertical wiring instead of a mesh shape. The luminance non-uniformity of the pixel array DA and CA may be caused according to a variation in the load of the VDD line. In addition, since the VDD line to which the pixel driving voltage is applied is formed in the circuit layer together with the transistors of the pixel circuit, it is difficult to form the VDD line as an island pattern separated for each area. Accordingly, as a method of securing a margin between the ELVDD and ELVSS of the low PPI area, that is, the second pixel area CA, it is preferable to separate the cathode electrodes for each area of the pixel array DA and CA.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display panel comprising:

a substrate;

an anode electrode on the substrate;

an organic compound layer on the anode electrode; and a cathode electrode on the organic compound layer;

wherein the substrate includes a first pixel area and a second pixel area that is adjacent to the first pixel area, wherein the cathode electrode includes a first opening between the first pixel area and the second pixel area, and a second opening in the second pixel area that is non-overlapping with a light emitting layer of the display panel, wherein a shape of the first opening and a shape of the second opening are different from each other in a plan view of the display panel, and wherein the cathode electrode includes:

a first cathode electrode disposed in the first pixel area; and a second cathode electrode disposed in the second pixel area to separate from the first cathode electrode, the second cathode electrode having an inner electrode surrounded by the first opening and an extrusion electrode extending from one end of the inner electrode.

2. The display panel according to claim 1, wherein the first opening has a linear shape, and the second opening has a shape of one of a circular, an ellipse, and a polygon.

3. The display panel according to claim 1, wherein a pixels per inch of the second pixel area is less than a pixels per inch of the first pixel area.

4. The display panel according to claim 1, wherein:

the first pixel area includes a plurality of first pixels, the second pixel area includes a plurality of second pixels and a plurality of second openings, wherein at least one of the plurality of second pixels is surrounded by the plurality of second openings, wherein the plurality of second openings comprise transparent insulating materials without a metal.

5. The display panel according to claim 4, wherein each of the plurality of first pixels and the plurality of second pixels includes:

a light-emitting element; and a driving element configured to operate in a saturation area to supply current to the light-emitting element, and wherein an amount of current per unit pixel in the second pixel area is greater than an amount of current per unit pixel in the first pixel area.

6. The display panel according to claim 5, responsive to pixel data having a same grayscale value being written to the plurality of first pixels and the plurality of second pixels, a source-drain current of a driving element in the plurality of second pixels is greater than a source-drain current of a driving element in the plurality of first pixels.

7. The display panel according to claim 5, wherein the first cathode electrode is connected to the plurality of first pixels;

wherein the second cathode electrode is connected to the plurality of second pixels, wherein the first opening is between the first cathode electrode and the second cathode electrode to electrically separate the first cathode electrode and the second cathode electrode.

8. The display panel according to claim 7, wherein a voltage applied to the second cathode electrode is less than a voltage applied to the first cathode electrode.

9. The display panel according to claim 7, further comprising:

a power line connected to the second cathode electrode across the first pixel area, wherein the power line includes:

a routing wiring formed along a bezel of the display panel by bypassing a pixel array including the first pixel area and the second pixel area.

10. The display panel according to claim 7, wherein the second cathode electrode has a transmittance that is greater than a transmittance of the first cathode electrode.

11. A display device comprising:

a display panel including a first pixel area and a second pixel area that is adjacent to the first pixel area; and a sensor under the second pixel area of the display panel, wherein the first pixel area includes a plurality of first pixels, wherein the second pixel area includes a plurality of second pixels and a plurality of light transmitting portions, wherein at least one of the plurality of second pixels is surrounded by the plurality of light transmitting portions, wherein the plurality of light transmitting portions comprise of transparent insulating materials without a metal, wherein each of the plurality of first pixels and the plurality of second pixels includes:
an anode electrode;
an organic compound layer on the anode electrode; and
a cathode electrode on the organic compound layer, the cathode electrode including:
a first cathode electrode connected to the plurality of first pixels;
a second cathode electrode connected to the plurality of second pixels; and
an opening between the first pixel area and the second pixel area, the opening between the first cathode electrode and the second cathode electrode to electrically separate the first cathode electrode and the second cathode electrode,
wherein a voltage applied to the second cathode electrode is less than a voltage applied to the first cathode electrode;
a power supply unit configured to output the voltage applied to the second cathode electrode;
an adder configured to boost a voltage from the power supply unit and output the voltage applied to the first cathode electrode;
a flexible circuit board connected between the power supply unit and the display panel,
wherein the flexible circuit board includes:
a wiring connected to the power supply unit, wherein the voltage applied to the second cathode electrode is applied to the wiring connected to the power supply unit; and
a wiring connected to the adder, wherein the voltage applied to the first cathode electrode is applied to the wiring connected to the adder.

12. The display device according to claim 11, wherein each of the plurality of first pixels and the plurality of second pixels includes:
a light-emitting element; and
a driving element configured to operate in a saturation area to supply current to the light-emitting element, and
wherein an amount of current per unit pixel in the second pixel area is greater than an amount of current per unit pixel in the first pixel area.

13. The display device according to claim 12, responsive to pixel data having a same grayscale value being written to the plurality of first pixels and the plurality of second pixels, a source-drain current of a driving element in the plurality of second pixels is greater than a source-drain current of a driving element in the plurality of first pixels.

14. The display device according to claim 11,
wherein the power supply unit is configured to output the voltage applied to the first cathode electrode.

15. The display panel according to claim 1, wherein a width of the extrusion electrode in a first direction is smaller than that of the one end of the inner electrode.

16. The display panel according to claim 1, wherein a width of the extrusion electrode in a second direction crossing a first direction is smaller than that of the one end of the inner electrode.

17. The display panel according to claim 1, wherein the first opening surrounds the inner electrode and the extrusion electrode excluding one end of the extrusion electrode.

* * * * *